United States Patent
Tsuji et al.

(10) Patent No.: US 9,944,292 B2
(45) Date of Patent: Apr. 17, 2018

(54) WORKING VEHICLE

(71) Applicant: ISEKI & CO., LTD., Ehime-ken (JP)

(72) Inventors: Hidekazu Tsuji, Ehime-ken (JP); Yoshitaka Tani, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 353 days.

(21) Appl. No.: 14/823,400

(22) Filed: Aug. 11, 2015

(65) Prior Publication Data

US 2016/0053888 A1    Feb. 25, 2016

(30) Foreign Application Priority Data

Aug. 19, 2014 (JP) .................. 2014-166759

(51) Int. Cl.
| | | |
|---|---|---|
| F16H 59/54 | (2006.01) | |
| B60W 30/188 | (2012.01) | |
| B62D 63/02 | (2006.01) | |
| B60W 10/02 | (2006.01) | |
| B60K 17/34 | (2006.01) | |
| F16H 61/431 | (2010.01) | |
| F16H 61/439 | (2010.01) | |
| F16H 59/36 | (2006.01) | |
| F16H 59/70 | (2006.01) | |

(52) U.S. Cl.
CPC ......... B60W 30/1884 (2013.01); B60K 17/34 (2013.01); B60W 10/02 (2013.01); B62D 63/02 (2013.01); F16H 59/54 (2013.01); F16H 61/431 (2013.01); F16H 61/439 (2013.01); *B60Y 2200/221* (2013.01); *F16H 59/70* (2013.01); *F16H 2059/366* (2013.01)

(58) Field of Classification Search
CPC ... B60W 30/1884; B60W 10/02; B60K 17/34; B62D 63/02; F16H 59/54; F16H 61/431
USPC .......................................... 180/242
See application file for complete search history.

(56) References Cited

U.S. PATENT DOCUMENTS

| 6,217,473 B1 * | 4/2001 | Ueda ............... F16H 15/38 |
| | | 475/216 |
| 6,442,934 B1 * | 9/2002 | Okuda .............. F04B 49/002 |
| | | 60/451 |
| 6,569,051 B2 * | 5/2003 | Hirano .............. F16H 61/6648 |
| | | 192/44 |
| 7,162,853 B2 * | 1/2007 | Nagai ................ A01D 69/03 |
| | | 56/10.8 |

(Continued)

FOREIGN PATENT DOCUMENTS

JP     2007-224943 A    9/2007

*Primary Examiner* — Jacob D Knutson

(74) *Attorney, Agent, or Firm* — Bacon & Thomas, PLLC

(57) ABSTRACT

A working vehicle includes: a power transmission device which selects a four-wheel drive state and a two-wheel drive state; a hydraulic continuously variable transmission device which includes a trunnion arm displaceable to a forward movement position, a neutral position, and a backward movement position; a pedaling operation detection unit which detects a pedaling operation for a brake pedal; and a control unit which performs a process of moving the trunnion arm to the neutral position by controlling an actuator when the pedaling operation detection unit detects the pedaling operation and which sets the operation speed of the actuator to be slow in the four-wheel drive state during the process compared to the two-wheel drive state.

5 Claims, 12 Drawing Sheets

(56) References Cited

U.S. PATENT DOCUMENTS

| | | | | |
|---|---|---|---|---|
| 7,832,520 B2* | 11/2010 | Murakami | ............ | A01B 67/00 |
| | | | | 180/338 |
| 7,900,737 B2* | 3/2011 | Isogai | .................... | B60K 17/10 |
| | | | | 180/305 |
| 7,987,669 B2* | 8/2011 | Irikura | ................. | B60K 17/105 |
| | | | | 417/375 |
| 2003/0103850 A1* | 6/2003 | Szulczewski | ............ | B60K 6/12 |
| | | | | 417/319 |
| 2009/0260912 A1* | 10/2009 | Isogai | .................... | B60K 17/10 |
| | | | | 180/336 |

* cited by examiner

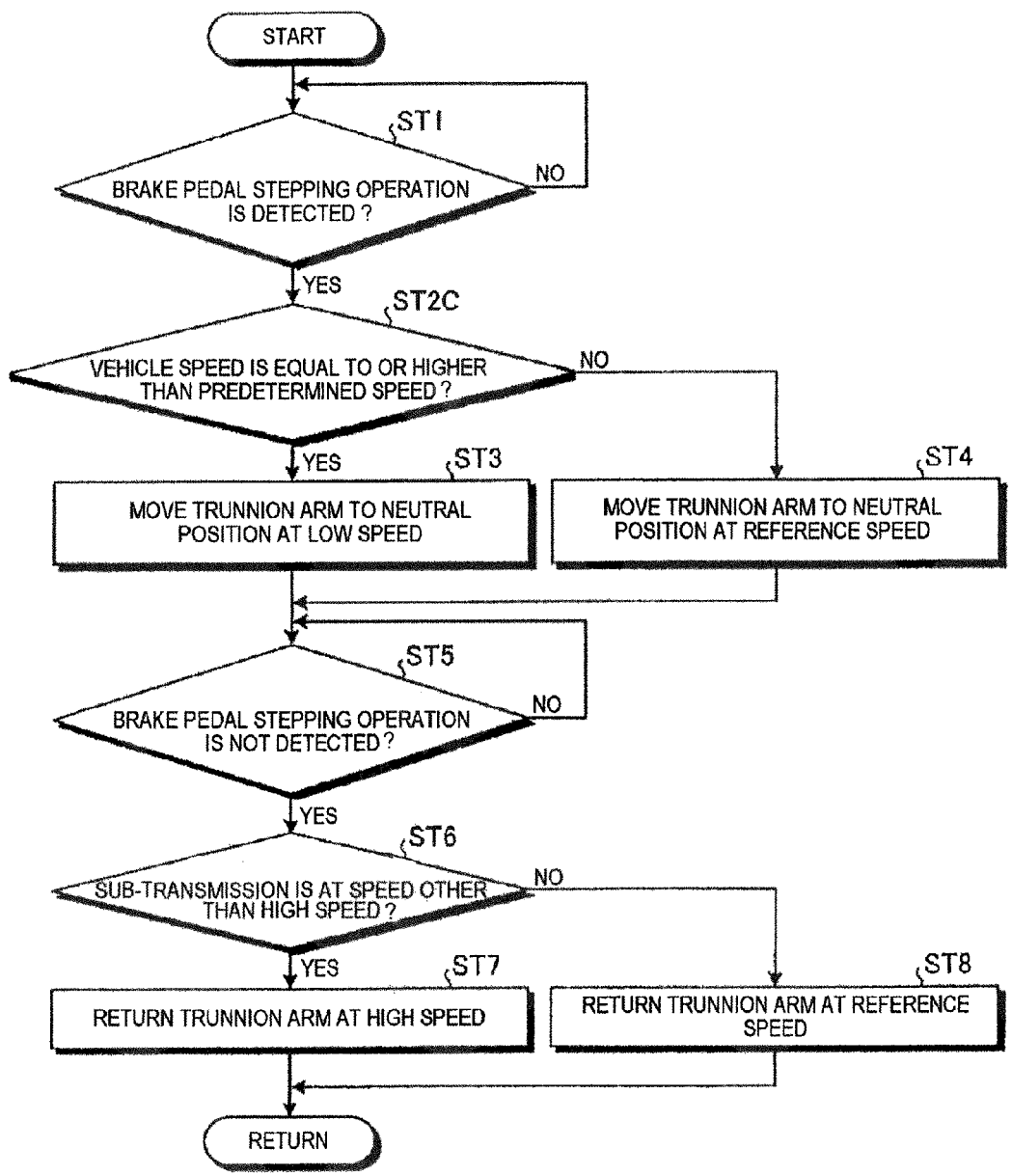

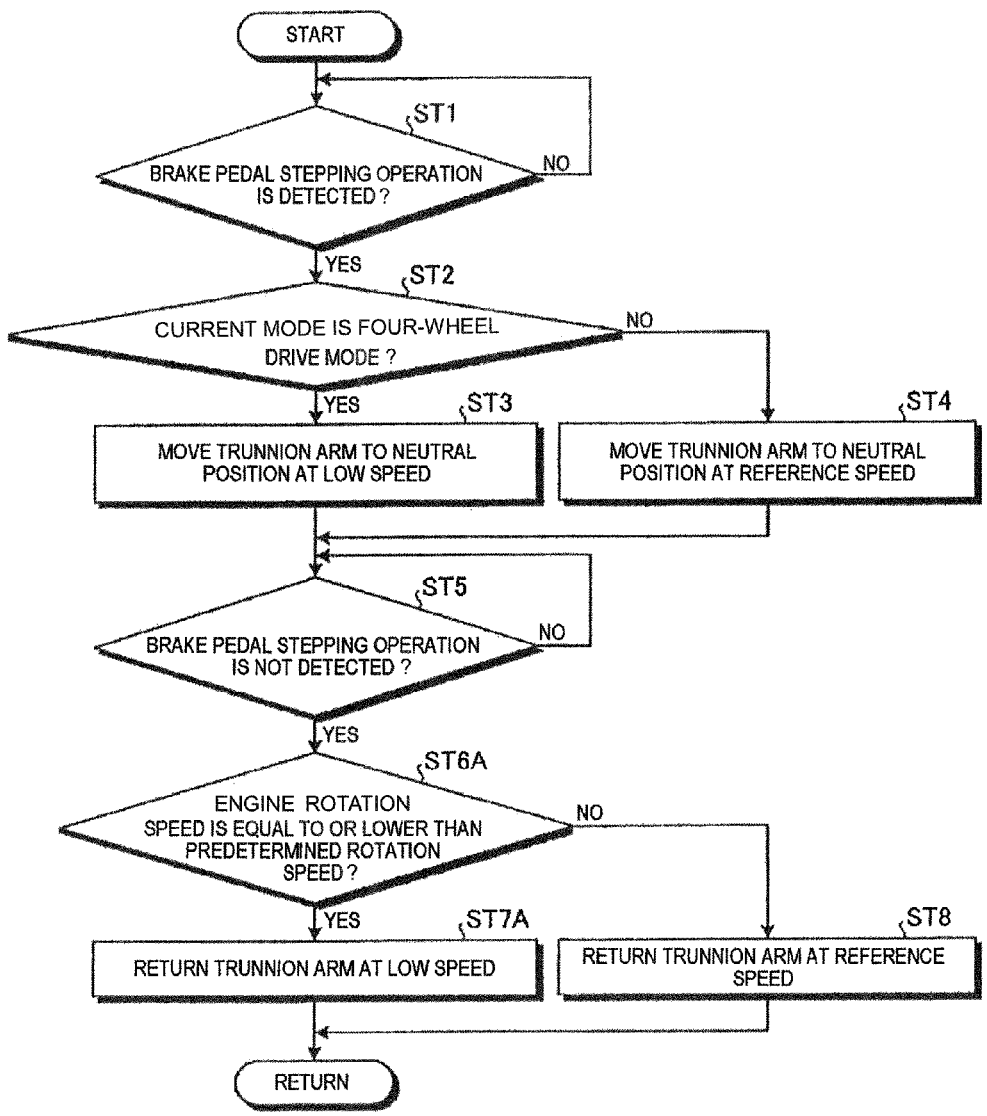

WORKING VEHICLE

BACKGROUND OF THE INVENTION

The present invention relates to a working vehicle.

RELATED ART OF THE INVENTION

Conventionally, regarding a working vehicle including a traveling vehicle body and a power transmission device equipped with a hydraulic continuously variable transmission device, there is known a working vehicle capable of avoiding a stop of an engine without operating a clutch when the traveling vehicle body is stopped by returning a trunnion arm of the hydraulic continuously variable transmission device to a neutral position when an operation for a brake pedal is detected (for example, refer to Japanese Patent Application Publication No. 2007-224943).

SUMMARY OF THE INVENTION

Problems to be Solved by the Invention

However, in such a traveling vehicle, an impact is generated in a stopped vehicle in accordance with a vehicle state, and hence a problem arises in that the traveling vehicle body may not be smoothly stopped.

The present invention is made in view of the above-described problem, and an object of the present invention is to provide a working vehicle capable of smoothly stopping a traveling vehicle body.

In order to achieve the object by solving the above-described problems, according to the $1^{st}$ aspect of the present invention, there is provided a working vehicle comprising:
 a traveling vehicle body which includes vehicle wheels;
 an engine which is mounted on the traveling vehicle body;
 a power transmission device which selects a four-wheel drive state or a two-wheel drive state, the four-wheel drive state transmitting power of the engine to a front wheel and a rear wheel of the vehicle wheels, and the two-wheel drive state transmitting the power of the engine to one of the front wheel and the rear wheel;
 a hydraulic continuously variable transmission device which includes a trunnion shaft displaceable among a forward movement position, a neutral position, and a backward movement position;
 an actuator which displaces the trunnion shaft;
 a switching operation unit which is used to select the four-wheel drive state or the two-wheel drive state;
 a brake pedal which brakes the vehicle wheels; and
 a pedaling operation detection unit which detects an operation for the brake pedal,
 wherein the working vehicle further comprises a control unit which performs a process for moving the trunnion shaft to the neutral position by controlling the actuator when the pedaling operation detection unit detects the operation for the brake pedal, so that an operation speed of the actuator in a case of the four-wheel drive state, is set to be slow as compared with an operation speed of the actuator in a case of the two-wheel drive state.

According to the $2^{nd}$ aspect of the present invention, there is provided a working vehicle comprising:
 a traveling vehicle body which includes vehicle wheels;
 an engine which is mounted on the traveling vehicle body;
 a power transmission device which is provided between the engine and the vehicle wheels and transmits power of the engine to the vehicle wheels;
 a hydraulic continuously variable transmission device which includes a trunnion shaft displaceable among a forward movement position, a neutral position, and a backward movement position;
 an actuator which displaces the trunnion shaft;
 a brake pedal which brakes the vehicle wheels; and
 a pedaling operation detection unit which detects an operation for the brake pedal; and
 a rotation speed detection unit which detects a rotation speed of the engine,
 wherein the working vehicle further comprises a control unit which performs a process for moving the trunnion shaft to the neutral position by controlling the actuator when the pedaling operation detection unit detects the operation for the brake pedal, so that an operation speed of the actuator in a case where the rotation speed detected by the rotation speed detection unit is equal to or lower than a first predetermined rotation speed, is set to be fast as compared with an operation speed of the actuator in a case where the rotation speed detected by the rotation speed detection unit exceeds the first predetermined rotation speed.

According to the $3^{rd}$ aspect of the present invention, there is provided a working vehicle comprising:
 a traveling vehicle body which includes vehicle wheels;
 an engine which is mounted on the traveling vehicle body;
 a power transmission device which is provided between the engine and the vehicle wheels and transmits power of the engine to the vehicle wheels;
 a hydraulic continuously variable transmission device which includes a trunnion shaft displaceable among a forward movement position, a neutral position, and a backward movement position;
 an actuator which displaces the trunnion shaft;
 a switching operation unit which is used to select a four-wheel drive state or a two-wheel drive state;
 a brake pedal which brakes the vehicle wheels;
 a pedaling operation detection unit which detects an operation for the brake pedal; and
 a speed detection unit which detects a travel speed of the traveling vehicle body,
 wherein the working vehicle further comprises a control unit which performs a process for moving the trunnion shaft to the neutral position by controlling the actuator when the pedaling operation detection unit detects the operation for the brake pedal, so that an operation speed of the actuator in a case where the travel speed detected by the speed detection unit is equal to or higher than a predetermined speed, is set to be slow as compared with an operation speed of the actuator in a case where the travel speed detected by the speed detection unit is lower than the predetermined speed.

According to the $4^{th}$ aspect of the present invention, there is provided the working vehicle according to the $1^{st}$ aspect of the present invention or the $3^{rd}$ aspect of the present invention, wherein the control unit returns the trunnion shaft to a position obtained before the trunnion shaft is moved to the neutral position by controlling the actuator when the pedaling operation comes to be not detected after a state where the pedaling operation detection unit detects the pedaling operation.

According to the $5^{th}$ aspect of the present invention, there is provided the working vehicle according to the $4^{th}$ aspect of the present invention further comprising:
 a sub-transmission which is capable of changing speed in a plurality of levels by a sub-shift lever; and
 a sub-shift lever detection unit which detects a position of the sub-shift lever, wherein when the position of the sub-shift lever detected by the sub-shift lever detection unit is located at a position other than a high-speed position, an operation speed of the actuator is set to be fast as compared with an operation speed of the actuator in a case where the position of the sub-shift lever detected by the sub-shift lever detection unit is located at the high-speed position.

According to the 6$^{th}$ aspect of the present invention, there is provided the working vehicle according to the 4$^{th}$ aspect of the present invention or the 5$^{th}$ aspect of the present invention, further comprising:

a rotation speed detection unit which detects the rotation speed of the engine, wherein when the rotation speed detected by the rotation speed detection unit is equal to or lower than a second predetermined rotation speed, an operation speed of the actuator is set to be slow as compared with an operation speed of the actuator in a case where the rotation speed detected by the rotation speed detection unit exceeds the second predetermined rotation speed.

According to the 7$^{th}$ aspect of the present invention, there is provided the working vehicle according to the 2$^{nd}$ aspect of the present invention, wherein when the operation for the brake pedal comes to be not detected after a state where the pedaling operation detection unit detects the operation for the brake pedal, the control unit controls the actuator so that the trunnion shaft is returned to a position obtained before the trunnion shaft is moved to the neutral position.

According to the 8$^{th}$ aspect of the present invention, there is provided the working vehicle according to the 7$^{th}$ aspect of the present invention, further comprising:

a sub-transmission which is capable of changing speed in a plurality of levels by a sub-shift lever; and a sub-shift lever detection unit which detects a position of the sub-shift lever, wherein when the position of the sub-shift lever detected by the sub-shift lever detection unit is located at a position other than a high-speed position, an operation speed of the actuator is set to be fast as compared with an operation speed of the actuator in a case where the position of the sub-shift lever detected by the sub-shift lever detection unit is located at the high-speed position.

According to the 9$^{th}$ aspect of the present invention, there is provided the working vehicle according to the 7$^{th}$ aspect of the present invention or the 8$^{th}$ aspect of the present invention, wherein when the rotation speed detected by the rotation speed detection unit is equal to or lower than a second predetermined rotation speed, an operation speed of the actuator is set to be slow as compared with an operation speed of the actuator in a case where the rotation speed detected by the rotation speed detection unit exceeds the second predetermined rotation speed.

The working vehicle according to the present invention has an effect that the traveling vehicle body can be smoothly stopped.

BRIEF DESCRIPTION OF THE DRAWINGS

FIG. 7(*b*) is a plan view illustrating the hydraulic continuously variable transmission device in which the trunnion arm inside the transmission case of the tractor according to the first embodiment is located at a neutral position;

FIG. 7(*c*) is a plan view illustrating the hydraulic continuously variable transmission device in which the trunnion arm inside the transmission case of the tractor according to the first embodiment is located at a backward movement position;

FIG. 13 is one example of a flowchart of a process that is performed by a controller of a tractor according to a third embodiment; and FIG. 14 is one example of a flowchart of a process that is performed by a controller of a tractor according to a fourth embodiment.

DESCRIPTION OF THE REFERENCE NUMERALS

Figure 1:
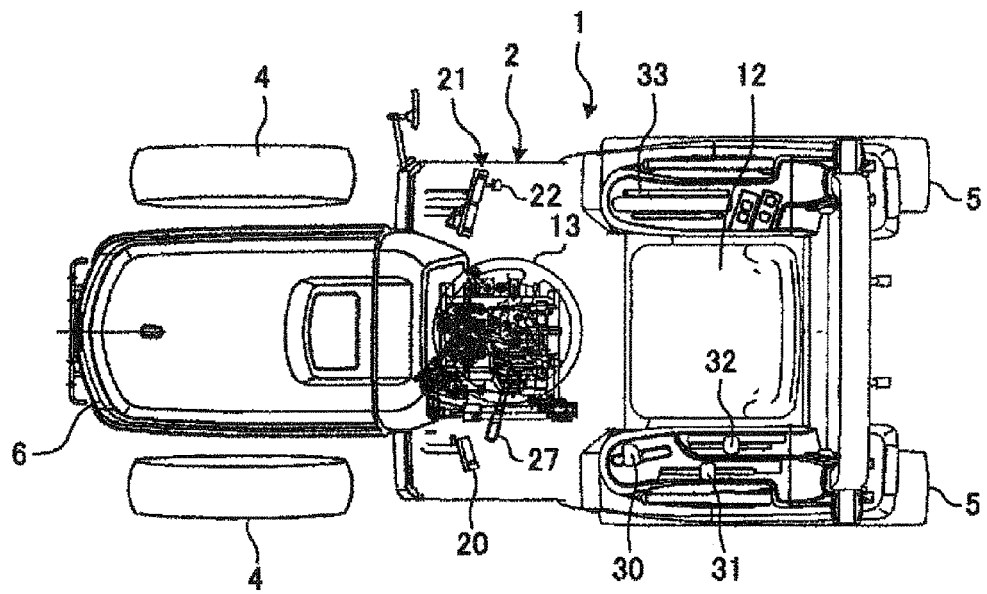
FIG. 1 is a plan view illustrating a tractor according to a first embodiment.

1: tractor (working vehicle)
2: traveling vehicle body
3: controller (control unit)
4: front wheel (vehicle wheel)
5: rear wheel (vehicle wheel)
7: engine
8: hydraulic continuously variable transmission device
9: sub-transmission
15: power transmission device
21: brake pedal
25: brake pedal detection sensor (pedaling operation detection unit)
31: sub-shift lever
52: hydraulic cylinder (actuator)
62: trunnion arm
162: engine rotation speed sensor (rotation speed detection unit)
163: vehicle speed sensor (speed detection unit)
165: two-wheel/four-wheel selection switch (switching operation unit)
168: sub-shift lever detection sensor (sub-shift lever detection unit)

DETAILED DESCRIPTION OF THE INVENTION

Hereinafter, embodiments will be described in detail with reference to the drawings. Embodiments below include the same components. Accordingly, the same reference numerals and signs will be given to the same components below, and the repetitive description thereof will not be presented.

First Embodiment

Figure 2:
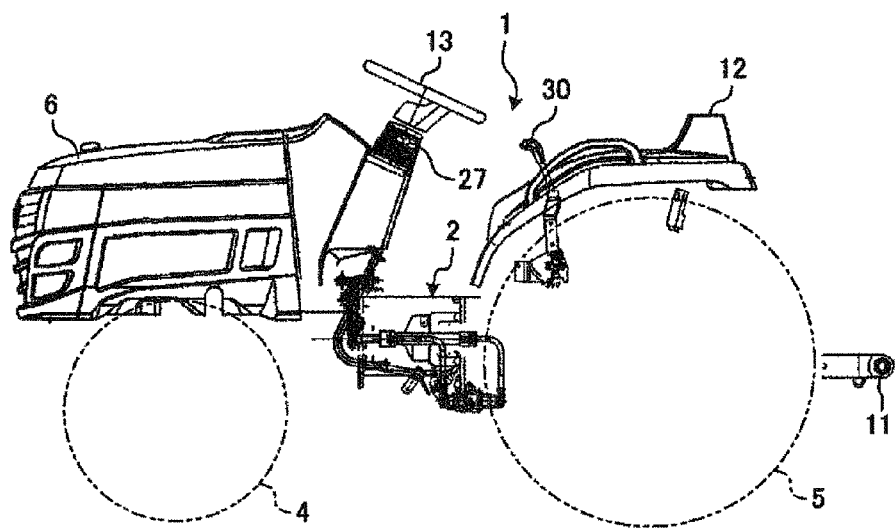
FIG. 2 is a side view illustrating a tractor according to the first embodiment.
Figure 3:
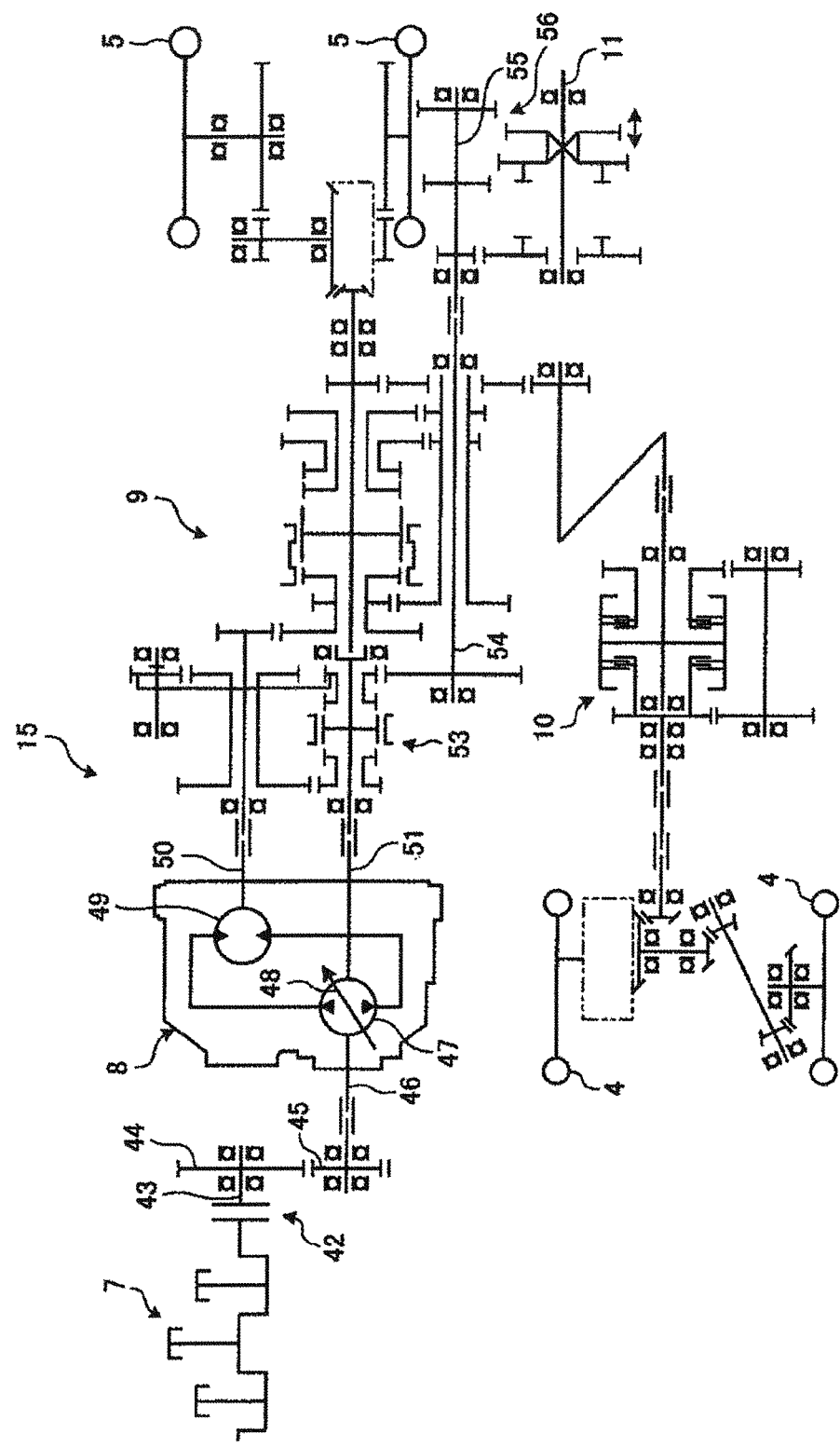
FIG. 3 is a power transmission line diagram inside a transmission case of the tractor according to the first embodiment.
Figure 4:
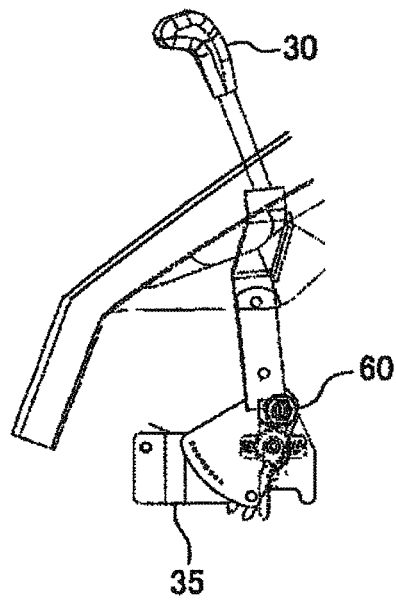
FIG. 4 is a side view illustrating a main shift lever and the like of the tractor according to the first embodiment.
Figure 5:
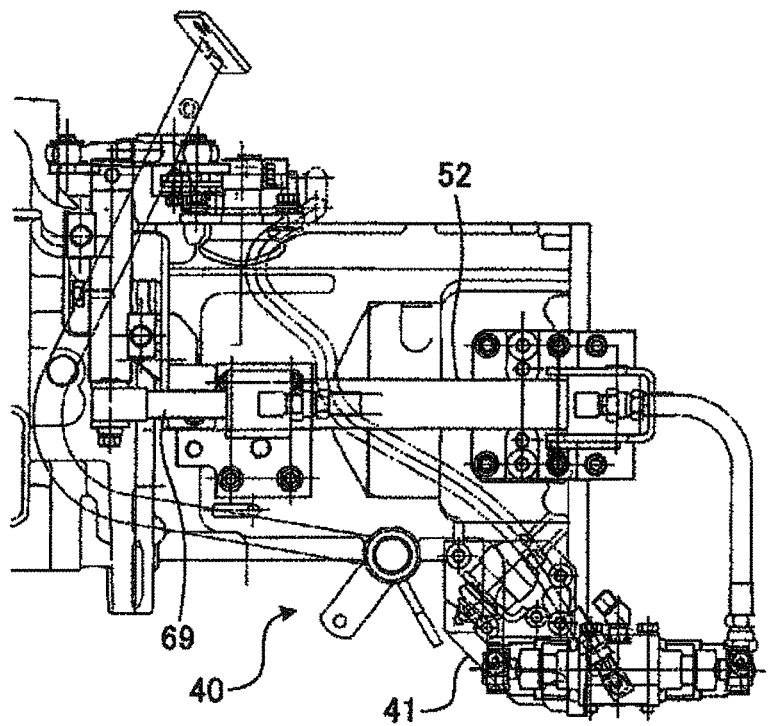
FIG. 5 is a side view illustrating a part of the transmission case of the tractor according to the first embodiment.
Figure 6:
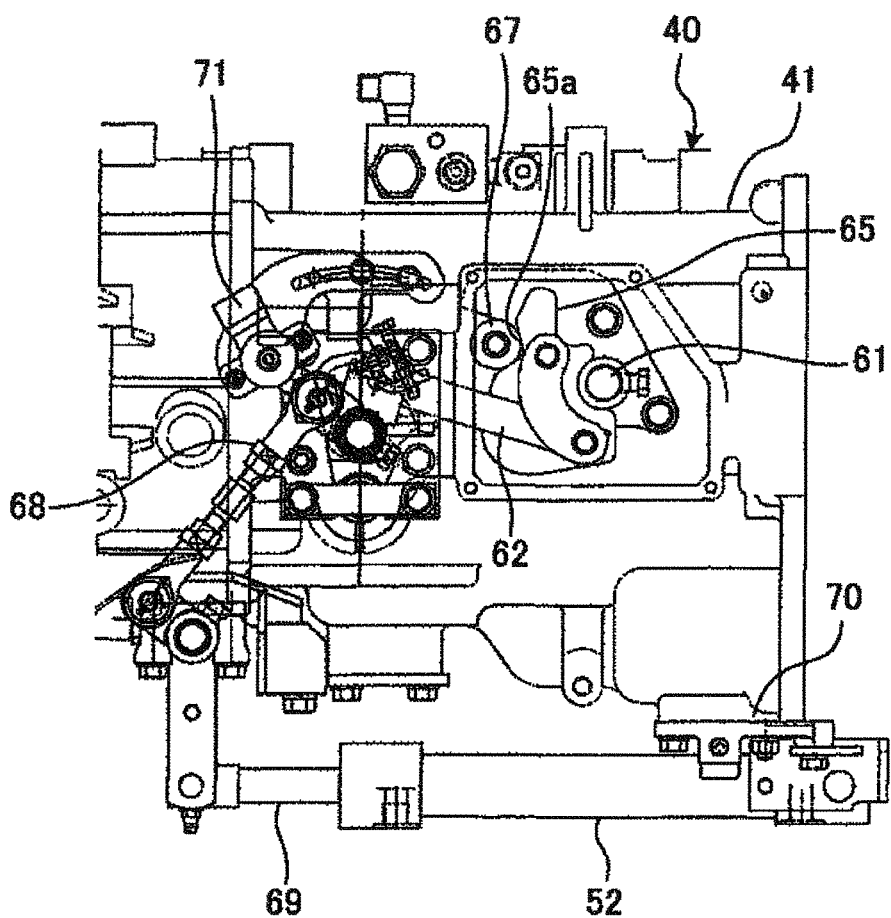
FIG. 6 is a plan view illustrating a part of the transmission case of the tractor according to the first embodiment.
Figure 8:
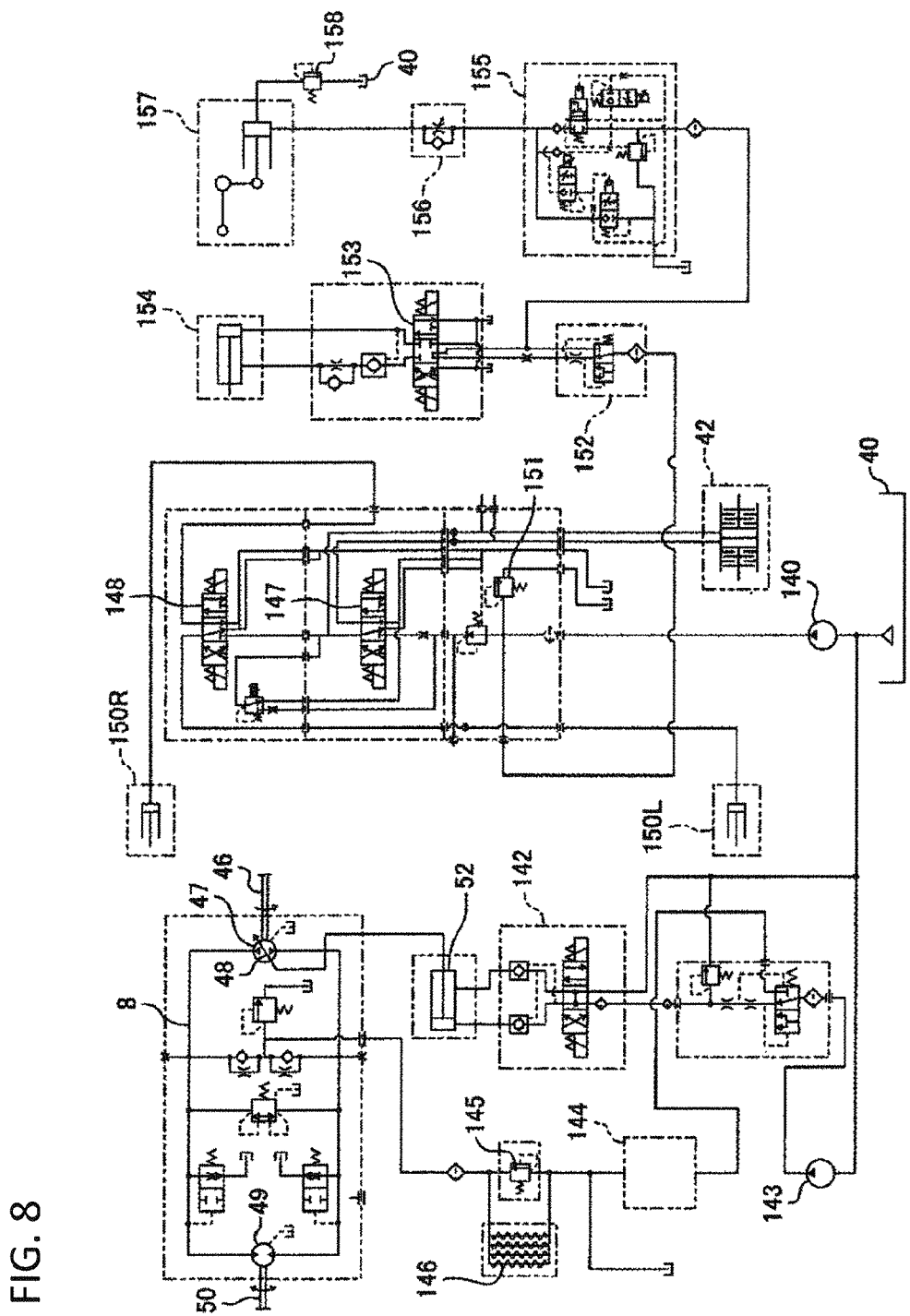
FIG. 8 is a hydraulic circuit diagram of the tractor according to the first embodiment.
Figure 9:
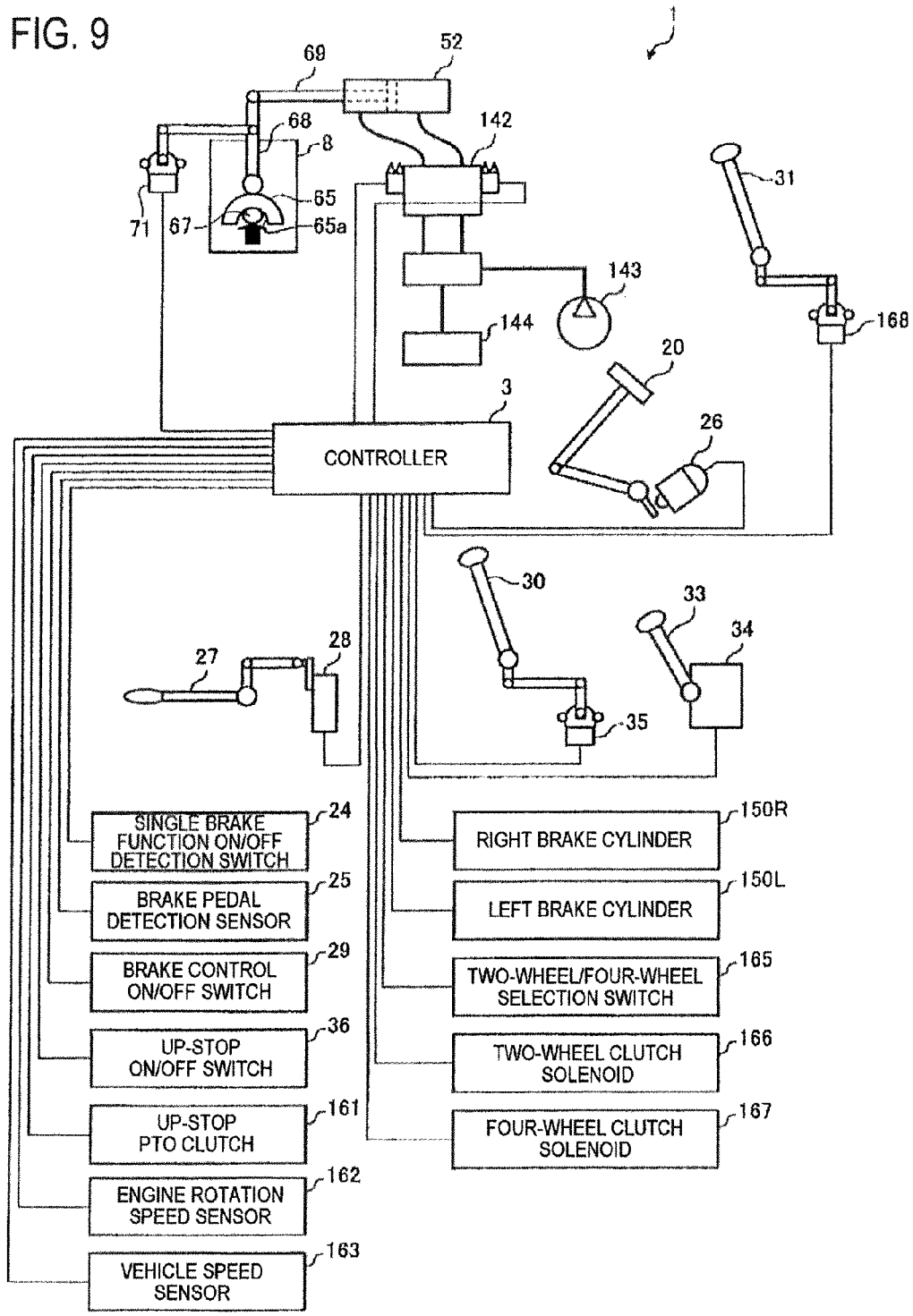
FIG. 9 is a block diagram of the tractor according to the first embodiment.

FIG. 1 is a plan view illustrating a tractor according to the embodiment. FIG. 2 is a side view illustrating the tractor according to the embodiment. FIG. 3 is a power transmission line diagram inside a transmission case of the tractor according to the embodiment. FIG. 4 is a side view illustrating a main shift lever and the like of the tractor according to the embodiment. FIG. 5 is a side view illustrating a part of the transmission case of the tractor according to the embodiment. FIG. 6 is a plan view illustrating a part of the transmission case of the tractor according to the embodiment. FIG. 7 is a plan view illustrating a hydraulic continuously variable transmission device and the like inside the transmission case of the tractor according to the embodiment. FIG. 8 is a hydraulic circuit diagram of the tractor as a working vehicle according to the embodiment. FIG. 9 is a block diagram of the tractor as the working vehicle according to the embodiment.

A tractor 1 according to the embodiment is a working vehicle that is used to conduct a work in an agricultural field and includes, as shown in FIGS. 1 and 2, a traveling vehicle body 2 which includes left and right front wheels 4 provided as steering vehicle wheels and left and right rear wheels 5 provided as driving vehicle wheels, an engine 7 (shown in FIG. 3) which is mounted in a bonnet 6 at a front part of the traveling vehicle body 2, a power transmission device 15 (shown in FIG. 3) which is provided among the engine 7, the left and right front wheels 4 and the left and right rear wheels 5, a controller 3 (shown in FIG. 9 and corresponding to a control unit), and the like. Furthermore, the power transmission device 15 will be also referred to as a traveling transmission device.

As shown in FIG. 3, the power transmission device 15 includes a hydraulic continuously variable transmission device 8, a sub-transmission 9, and a front wheel speed-up mechanism 10. The power transmission device 15 transmits power generated by the engine 7 to the rear wheels 5 while appropriately decreasing (changing) the speed thereof by the hydraulic continuously variable transmission device 8 and the sub-transmission 9. The rear wheels 5 are driven by the power transmitted thereto. Further, the power transmission device 15 is also adapted to transmit the power, which is generated by the engine 7 and is decreased in speed by the hydraulic continuously variable transmission device 8 and the sub-transmission 9, to the front wheels 4 through the front wheel speed-up mechanism 10. When the power is transmitted from the front wheel speed-up mechanism 10 to the tractor 1, four wheels of the front wheels 4 and the rear wheels 5 are driven by the power transmitted from the engine 7. On the other hand, when the front wheel speed-up mechanism 10 interrupts the transmission of the power, only two wheels, for instance, the rear wheels 5 are driven by the power transmitted from the engine 7. That is, the tractor 1 (the power transmission device 15) can select a four-wheel drive state where the power of the engine 7 is transmitted to the left and right front wheels 4 as well as the left and right rear wheels 5, or a two-wheel drive state where the power of the engine 7 is transmitted to one of the left and right front wheels 4 and the left and right rear wheels 5 (for example, the power of the engine 7 is transmitted to the left and right rear wheels 5). Here, the two-wheel drive state will be also referred to as a two-wheel drive mode, and the four-wheel drive state will be also referred to as a four-wheel drive mode. Further, a PTO (Power Take-Off) output shaft 11, being associated with a working machine such as a rotary (not shown), is disposed at the rear part of the traveling vehicle body 2 of the tractor 1. Furthermore, in the two-wheel drive mode, the power of the engine 7 may be transmitted to the left and right front wheels 4 instead of the left and right rear wheels 5.

Further, a driver seat 12 for a driver operating the tractor 1 is provided at the center part of the traveling vehicle body 2 of the tractor 1 as shown in FIG. 1, and a steering handle 13, which is used to steer the front wheels 4, is provided at the front side of the driver seat 12 as shown in FIGS. 1 and 2. The steering handle 13 is disposed at an upper end side of a handle post that rotatably supports the steering handle 13. Further, as shown in FIG. 1, a clutch pedal 20, a brake pedal 21 which brakes the rear wheels 5 in response to a stepping operation as a pedaling operation, and an accelerator pedal 22 are provided at the lower side of the handle post, that is, the vicinity of the feet of the driver sitting on the driver seat 12. In the embodiment, an example is described in which the brake pedal 21 is stepped as a pedaling operation in order to brake the rear wheels 5. However, the brake pedal 21 may be stepped in order to brake at least one of the left and right front wheels 4 and the left and right rear wheels 5.

Figure 10:
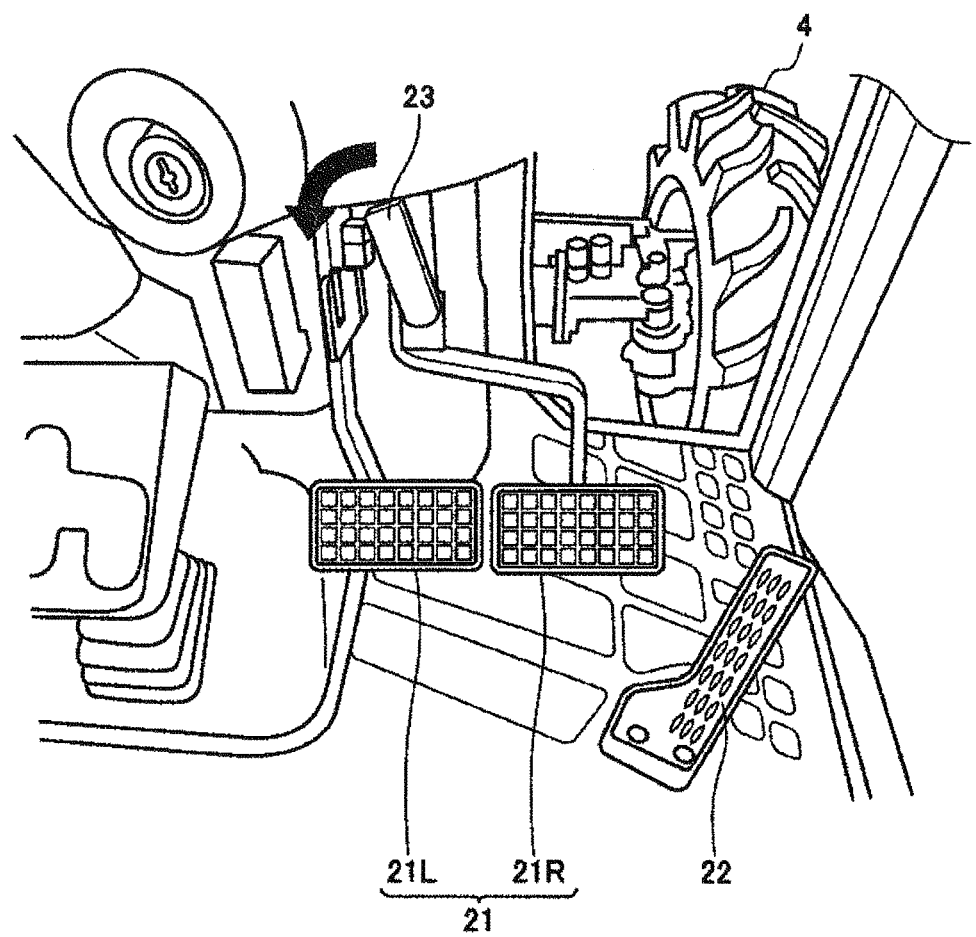
FIG. 10 is a diagram illustrating a brake pedal and the like of the tractor according to the first embodiment.

FIG. 10 is a diagram illustrating a brake pedal and the like of the tractor according to the embodiment. As shown in FIG. 10, the brake pedal 21 is provided as two brake pedals, that is, a left brake pedal 21L which applies a braking force to the left rear wheel 5 and a right brake pedal 21R which applies a braking force to the right rear wheel 5. That is, the tractor 1 includes the left brake pedal 21L and the right brake pedal 21R which respectively apply braking forces to the left and right rear wheels 5. These two brake pedals 21L and 21R can be connected to each other in a manner such that a brake lock plate 23 (a brake connection/separation pedal) rotatably provided in the right brake pedal 21R falls toward the left brake pedal 21L so as to engage with the left brake pedal 21L. That is, the tractor 1 includes the brake lock plate 23 which selects a dual brake mode, which connects the left brake pedal 21L and the right brake pedal 21R, or a single brake mode, which separates the left brake pedal 21L from the right brake pedal 21R so that each brake pedal can be independently stepped.

For this reason, when two brake pedals 21L and 21R are separately operated, it is possible to independently apply a braking force to each of the left and right rear wheels 5 by setting the brake lock plate 23 in the single brake mode. When two brake pedals 21L and 21R are operated in a connection state, it is possible to apply a braking force to both the left and right rear wheels 5 by setting the brake lock plate 23 in the dual brake mode. Furthermore, a single brake function on/off detection switch 24 (shown in FIG. 9) is provided in the vicinity of two brake pedals 21L and 21R so as to detect a state whether the brake lock plate 23 connects two brake pedals 21L and 21R together or not. The single brake function on/off detection switch 24 outputs a detection result to the controller 3. The single brake function on/off detection switch 24 will be also referred to as a brake connection/separation pedal on/off detection switch.

Further, a brake pedal detection sensor 25 (corresponding to a pedaling operation detection unit, and shown in FIG. 9) is provided at the rotation center of the brake pedal 21 so as to detect the stepping operation to the brake pedal 21 as the pedaling operation by the driver. The brake pedal detection sensor 25 outputs a detection result to the controller 3. The brake pedal detection sensor 25 can detect each stepping operation for two brake pedals 21L and 21R.

Further, a clutch pedal switch 26 (shown in FIG. 9) which detects the stepping operation to the clutch pedal 20 as the pedaling operation by the driver is provided. The clutch pedal switch 26 outputs a detection result to the controller 3.

Further, a forward/backward movement selection lever 27 (shown in FIGS. 1, 2, and 9) which switches the travel direction to the forward movement direction or the backward movement direction while the tractor 1 travels is disposed on the handle post. The forward/backward movement selection lever 27 is made to fall forward when the tractor 1 needs to travel forward, and is made to fall backward when the tractor 1 needs to travel backward. Accordingly, the travel direction of the traveling vehicle body 2 is switched to the forward movement direction or the backward movement direction by the power generated from the engine 7.

Further, the forward/backward movement selection lever 27 includes a neutral position between a forward movement position and a backward movement position. The neutral position is set as a position where the tractor 1 does not travel in any one of the forward and the backward movement directions. In the forward/backward movement selection lever 27, the operation position (the forward movement position, the backward movement position, or the neutral position) of the forward/backward movement selection lever 27 is detected by the forward/backward lever position detection switch 28 (shown in FIG. 9). That is, the forward/backward lever position detection switch 28 is used to detect the operation position of the forward/backward movement selection lever 27. The forward/backward lever position detection switch 28 outputs a detection result to the controller 3.

Further, a brake control on/off switch 29 (shown in FIG. 9) is provided in the vicinity of the forward/backward movement selection lever 27. The brake control on/off switch 29 is a switch which switches an execution or non-execution of a brake stop control mode in which the controller 3 stops the traveling vehicle body 2 without engine stall just by the stepping operation for the brake pedal 21 without need of the stepping operation to the clutch pedal 20. The brake control on/off switch 29 is connected to the controller 3. Thus, the brake stop control mode is executed when the brake control on/off switch 29 is turned on, and the brake stop control mode is not executed when the brake control on/off switch 29 is turned off.

Further, a main shift lever 30 (shown in FIG. 1 and the like) which is used to change the speed of the tractor 1 while the tractor travels, a sub-shift lever 31 (shown in FIG. 1), and a PTO clutch lever 32 which drives or does not drive the PTO output shaft 11 for driving the working machine attached to the rear part of the tractor 1 are disposed at the left side of the driver seat 12. The main shift lever 30 is used to shift the hydraulic continuously variable transmission device 8 to a first-speed level to an eighth-speed level. The sub-shift lever 31 is used to shift the gear of the sub-transmission 9 so that the travel speed of the traveling vehicle body 2 changes to three speed levels, that is, a low speed, a middle speed, and a high speed. Here, the sub-transmission 9 has a different gear ratio at a low speed, a middle speed, and a high speed. That is, the sub-transmission 9 includes a plurality of gear ratios which can be selectively set. The gear ratio (or the value thereof) of the sub-transmission 9 decreases in order of the low speed, the middle speed, and the high speed as the state of the sub-transmission 9 (that is, as the gear position increases). The sub-shift lever 31 can be displaced to a plurality of positions, and the gear ratio of the sub-transmission 9 is set in response to the position. Specifically, the sub-shift lever 31 can be displaced to a low-speed position where the sub-transmission 9 is set to a position of a low speed, a middle-speed position where the sub-transmission 9 is set to a position of a middle speed, and a high-speed position where the sub-transmission 9 is set to a position of a high speed. Furthermore, the positions of the low speed and the middle speed of the sub-shift lever 31 are selected as a work travel speed range where the tractor conducts a work within an agricultural field, and the position of the high speed of the sub-shift lever 31 is selected as a road travel speed range where the tractor travels on a road when moving from one agricultural field to another.

Further, a positioning lever 33 which adjusts the height of the working machine is disposed at the right side of the driver seat 12. The operation position of the positioning lever 33 is detected by a positioning lever position detection sensor 34 (shown in FIG. 9). The positioning lever position detection sensor 34 outputs a detection result to the controller 3.

Further, the power of the engine 7 of the tractor 1 is increased or decreased in speed through the transmission case 40 (partly shown in FIG. 5) and the like, and is transmitted to the front and rear wheels 4 and 5 and the PTO output shaft 11. The transmission case 40 is functioning as a main frame of the traveling vehicle body 2 at the lower side of the driver seat 12, and as shown in FIG. 5, has a configuration in which a front case 41 is integrally connected to four other cases (not shown).

Next, the power transmission device 15 inside the transmission case 40 will be described in detail with reference to FIG. 3. In the power transmission device 15, the rotation of the output shaft of the engine 7 is transmitted to an input shaft 43 of the transmission case 40 (shown in FIG. 5) through a main clutch 42 operated by the clutch pedal 20. The rotation of the input shaft 43 is increased in speed by speed-up gears 44 and 45, and is transmitted to an input shaft 46 of the hydraulic continuously variable transmission device 8. That is, the power of the engine 7 is input to the hydraulic continuously variable transmission device 8.

The hydraulic continuously variable transmission device 8 is configured as a hydrostatic continuously-variable-transmission called HST (Hydraulic Static Transmission). The hydraulic continuously variable transmission device 8 is used to transmit driving power generated from the engine 7 to the rear wheels 5. The hydraulic continuously variable transmission device 8 includes a variable capacity hydraulic pump 47 and a fixed capacity hydraulic motor 49, and the rotation of the hydraulic motor 49 is changed in accordance with a change in the inclination of a movable swash plate 48 of the hydraulic pump 47. The inclination of the movable swash plate 48 is changed by a hydraulic cylinder 52 (shown in FIGS. 5 and 6) which is operated by detecting the movement of the main shift lever 30 or the forward/backward movement selection lever 27, and the rotation of a motor output shaft 50 of the hydraulic motor 49 is changed in speed. The rotation of the pump output shaft 51 directly connected to the hydraulic pump 47 has the same rotation speed as that of the input shaft 46.

The rotation of the pump output shaft 51 is transmitted from a first PTO intermediate shaft 54 to a second PTO intermediate shaft 55 through a PTO forward/backward clutch 53, and is finally extracted to the outside of the transmission case 40 by the PTO output shaft 11 through a PTO shift clutch 56, which drives the working machine such as a rotary and son on.

Further, the motor output shaft 50 of the hydraulic motor 49 drives the front and rear wheels 4 and 5 through the sub-transmission 9, and drives the front wheels 4 through the front wheel speed-up mechanism 10 in addition to the sub-transmission 9.

The hydraulic continuously variable transmission device 8 of the power transmission device 15 inside the transmission case 40 is shifted by the main shift lever 30. As shown in FIG. 4, the main shift lever 30 is lightly latched to eight positions and rotatable about a pin 60 that is formed to be normal to a side surface of an intermediate case constituting the transmission case 40. In this configuration, the main shift lever 30 is rotatably supported so that the driver feels the gear shift positions in eight positions. The rotation position of the main shift lever 30 is detected by a main shift lever position detection sensor 35, and a detection result is output to the controller 3.

The hydraulic continuously variable transmission device 8 is disposed inside the front case 41 constituting the transmission case 40. A neutral position maintaining mechanism 63 which maintains the trunnion shaft 61 and the trunnion arm 62 (shown in FIGS. 6 and 7) connected to the movable swash plate 48 at the neutral position is provided inside the front case 41 (see FIG. 7). The trunnion shaft 61 and the trunnion arm 62 move while being interlocked with the movable swash plate 48, and the rotation angles (the positions) of the trunnion shaft 61 and the trunnion arm 62 change in response to the inclination angle of the movable swash plate 48.

Figure 7A:
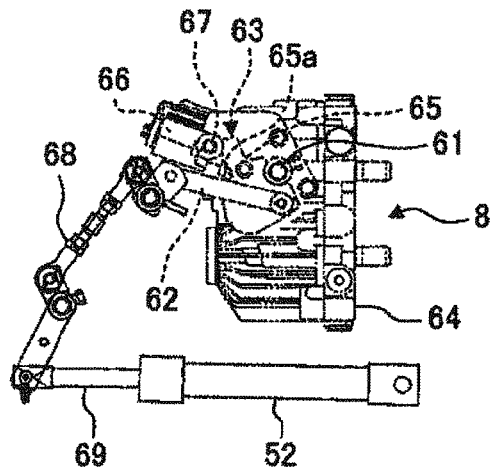
FIG. 7(*a*) is a plan view illustrating a hydraulic continuously variable transmission device in which a trunnion arm inside the transmission case of the tractor according to the first embodiment is located at a forward movement position.
Figure 7B:
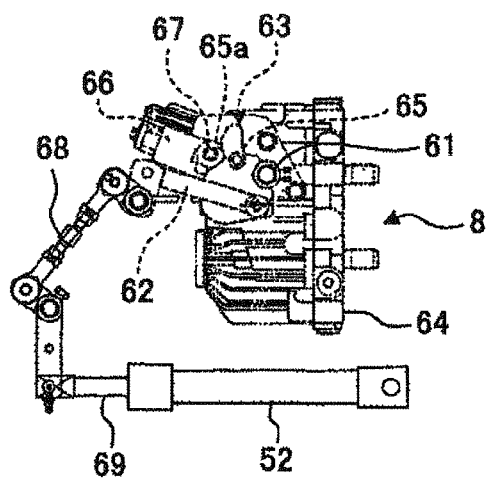
Figure 7C:
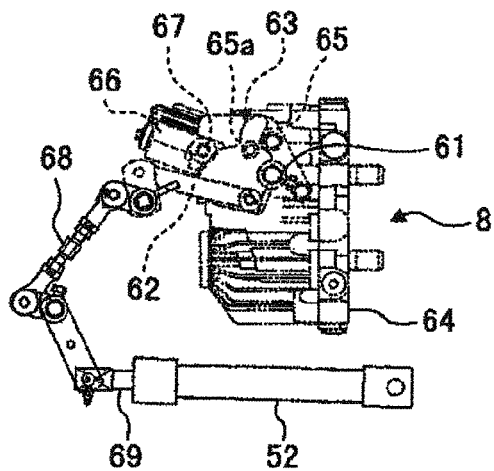

The trunnion arm 62 can be displaced to the forward movement position (FIG. 7(a)), the neutral position (FIG. 7(b)), and the backward movement position (FIG. 7(c)). The hydraulic continuously variable transmission device 8 outputs the power of the engine 7 as a force to move the traveling vehicle body 2 forward when the trunnion arm 62 is located at the forward movement position, outputs the power of the engine 7 as a force to move the traveling vehicle body 2 backward when the trunnion arm 62 is located at the backward movement position, and does not output the power of the engine 7 as a force to move the traveling vehicle body 2 forward or backward when the trunnion arm 62 is located at the neutral position.

The trunnion arm 62 is driven by the hydraulic cylinder 52. The hydraulic cylinder 52 is one example of an actuator which drives the trunnion arm 62. The movement speed of the trunnion arm 62 changes in response to the operation speed of the hydraulic cylinder 52. That is, the movement speed of the trunnion arm 62 becomes faster as the operation speed of the hydraulic cylinder 52 becomes faster. Hydraulic oil is supplied from a sub-pump 143 (shown in FIGS. 8 and 9) to the hydraulic cylinder 52 through a trunnion valve 142 (shown in FIGS. 8 and 9). In this configuration, the operation for the hydraulic cylinder 52 can be controlled by the control of the operation for the trunnion valve 142. The trunnion valve 142 is operated based on a pulse signal, and the duty ratio of the pulse signal is controlled by the controller 3, so that the operation speed of the hydraulic cylinder 52 and further the operation speed of the trunnion arm 62 can be changed.

As one example, the operation speed of the hydraulic cylinder 52 can be selectively set to a reference speed, a high speed faster than the reference speed, and a low speed slower than the reference speed. Furthermore, the speed of the hydraulic cylinder 52 is not limited to the above-described three speed levels. Furthermore, the reference speed of the hydraulic cylinder 52 will be also referred to as a standard speed. As one example, the reference speed of the hydraulic cylinder 52 may be set to a speed in which the traveling vehicle body 2 can comparatively smoothly stop or start to move so that a small impact or no impact is generated when the tractor travels on a road, that is, the sub-transmission 9 is set to the high speed and the power transmission device 15 is set to the two-wheel drive mode. The duty ratio of the pulse signal of the trunnion valve 142 corresponding to the reference speed of the hydraulic cylinder 52 can be adopted as an optimal (satisfactory) value through a test. Further, the operation speed of the trunnion arm 62 which is driven by the hydraulic cylinder 52 corresponds to each operation speed (the reference speed, the high speed, and the low speed) of the hydraulic cylinder 52. Specifically, the operation speed of the trunnion arm 62 becomes the reference speed of the trunnion arm 62 when the hydraulic cylinder 52 is operated at the reference speed, the operation speed of the trunnion arm 62 becomes the high speed faster than the reference speed of the trunnion arm 62 when the hydraulic cylinder 52 is operated at the high speed, and the operation speed of the trunnion arm 62 becomes the low speed slower than the reference speed of the trunnion arm 62 when the hydraulic cylinder 52 is operated at the low speed.

The neutral position maintaining mechanism 63 fixes a cam plate 65 (shown in FIG. 6) to the trunnion shaft 61 protruding from the inside of a case 64 having the hydraulic pump 47 and the hydraulic motor 49 therein in the upper surface of the hydraulic continuously variable transmission device 8 and presses a roller 67 biased by a spring cylinder 66 (shown in FIG. 7) against the circumferential edge cam of the cam plate 65. The neutral position maintaining mechanism 63 biases the roller 67 so that the roller sinks into a concave portion 65a of the circumferential edge cam of the cam plate 65, and is configured so that the trunnion shaft 61 and the trunnion arm 62 are returned to the neutral position (shown in FIG. 7(b)).

As shown in FIG. 7, one end of the trunnion arm 62 is rotatably connected to the cam plate 65, and the other end of the trunnion arm 62 is connected to a rod 69 of the hydraulic cylinder 52 through a link 68. Accordingly, when the rod 69 of the hydraulic cylinder 52 is lengthened and shortened, the trunnion shaft 61 rotates through the link 68, the trunnion arm 62, and the cam plate 65, so that the hydraulic continuously variable transmission device 8 is shifted. As shown in FIG. 6, the hydraulic cylinder 52 is supported by a bracket 70 attached to the side surface of the front case 41.

Further, the hydraulic continuously variable transmission device 8 includes a trunnion arm angle sensor 71 (shown in FIG. 6 and the like) which detects the rotation angle of the trunnion shaft 61, that is, the trunnion arm 62.

Further, in a hydraulic system which supplies a hydraulic oil to the hydraulic cylinder 52, the tractor 1 includes a main pump 140 which is used to control the working machine and the traveling operation and a sub-pump 143 which supplies a hydraulic oil of the hydraulic continuously variable transmission device 8 and the power steering 144 as shown in FIG. 8. Since the hydraulic oil of the hydraulic cylinder 52 rotating the trunnion shaft 61 is supplied from the sub-pump 143 to the trunnion valve 142, the working pressure is stabilized. Further, the hydraulic oil which is supplied from the sub-pump 143 is supplied to the power steering 144, and then supplied to the hydraulic continuously variable transmission device 8 through a relief valve 145 and an oil cooler 146.

Further, the hydraulic oil which is supplied from the main pump 140 is used to control the main clutch 42 through a traveling valve 147 and to control left and right brake cylinders 150L and 150R through a brake valve 148 while the hydraulic pressure thereof is adjusted by a main relief valve 151. Further, the branched hydraulic oil is supplied for the control of the parts which are related to the working machine.

The hydraulic oil which is supplied to the parts which are related to the working machine is supplied to a horizontal cylinder 154 and a main elevation cylinder 157 through a branch valve 152. The horizontal cylinder 154 is controlled by the horizontal valve 153, the main elevation cylinder 157 is controlled by an electronic hydraulic valve 155 and a slow return check valve 156, and the hydraulic oil is returned into the transmission case 40 through a safety relief valve 158.

As one example, the controller 3 includes a CPU (Central Processing Unit), a ROM (Read Only Memory), and a RAM (Random Access Memory). The controller 3 controls the components of the traveling vehicle body 2 by executing a program stored in the ROM.

The controller 3 outputs a control signal to each component of the tractor 1 based on the detection results of the forward/backward lever position detection switch 28, the main shift lever position detection sensor 35, the trunnion arm angle sensor 71, the clutch pedal switch 26, the positioning lever position detection sensor 34, a sub-shift lever detection sensor 168 detecting the position (the operation position) of the sub-shift lever 31, and the like. The sub-shift lever detection sensor 168 is one example of a sub-shift lever detection unit.

When the operation position of the forward/backward movement selection lever 27 is located at the forward movement position based on the detection result of the forward/backward lever position detection switch 28, the controller 3 lengthens the rod 69 of the hydraulic cylinder 52 in relation to the neutral position as shown in FIG. 7(a). Thus, the trunnion arm 62 shown in FIG. 7(a) is located at the forward movement position. When the operation position of the forward/backward movement selection lever 27 is located at the backward movement position based on the detection result of the forward/backward lever position detection switch 28, the controller 3 shortens the rod 69 of the hydraulic cylinder 52 in relation to the neutral position as shown in FIG. 7(c). Thus, the trunnion arm 62 shown in FIG. 7(c) is located at the backward movement position. Further, when the operation position of the forward/backward movement selection lever 27 is located at the forward movement position, the controller 3 lengthens the rod 69 of the hydraulic cylinder 52 in relation to the neutral position in response to the operation position of the main shift lever 30 based on the detection result of the main shift lever position detection sensor 35. Further, the controller 3 shifts the gear of the sub-transmission 9 in response to the operation position of the sub-shift lever 31 based on the detection result of the sub-shift lever detection switch (not shown).

Further, the controller 3 changes the height of the working machine in response to the operation position of the positioning lever 33 by controlling the main elevation cylinder 157 based on the detection result of the positioning lever position detection sensor 34. Further, an up-stop on/off switch 36 is connected to the controller 3 as shown in FIG. 9. The up-stop on/off switch 36 is a switch which is used to stop the working machine by interrupting the transmission of the power from the engine 7 to the working machine when the working machine is moved upward by the positioning lever 33. When the up-stop on/off switch 36 is turned on, the transmission of the power from the engine 7 to the working machine is interrupted when the working machine is moved upward. When the up-stop on/off switch is turned off, the power is continuously transmitted from the engine 7 to the working machine even when the working machine is moved upward. Specifically, the up-stop on/off switch 36 performs the above-described operation by controlling an up-stop PTO clutch 161.

As one example, in a case where the controller 3 performs the brake stop control mode, the trunnion arm 62 of the hydraulic continuously variable transmission device 8 is set to the neutral position so that the traveling vehicle body 2 is stopped or substantially stopped when the brake pedal detection sensor 25 detects the stepping operation for the brake pedal 21 by the driver.

Further, an engine rotation speed sensor 162 and a vehicle speed sensor 163 are connected to the controller 3. The engine rotation speed sensor 162 is one example of a rotation speed detection unit, and the vehicle speed sensor 163 is one example of a speed detection unit. The engine rotation speed sensor 162 detects the rotation speed of the engine 7, and outputs a detection result to the controller 3. The vehicle speed sensor 163 detects the travel speed of the traveling vehicle body 2, and outputs a detection result to the controller 3.

Further, a two-wheel/four-wheel selection switch 165 is connected to the controller 3. The two-wheel/four-wheel selection switch 165 is one example of a switching operation unit. The controller 3 can be configured to switch the drive state (the two-wheel drive mode and the four-wheel drive mode) of the power transmission device 15 by using a solenoid (for example, a two-wheel clutch solenoid 166 or a four-wheel clutch solenoid 167) and the like in response to the output of the two-wheel/four-wheel selection switch 165.

The tractor 1 according to the embodiment has the above-described configuration, and the operation thereof will be described below. When the tractor 1 travels, the rotation speed of the engine 7 is adjusted by the accelerator pedal 22 in a manner such that the shifting operations for the hydraulic continuously variable transmission device 8 and the sub-transmission 9 are instructed by the forward/backward movement selection lever 27, the main shift lever 30, and the sub-shift lever 31. Further, when the travel direction needs to be switched, the forward/backward movement direction is selected by the operation for the forward/backward movement selection lever 27. These operations are detected by sensors, and the detection result is input to the controller 3 or the like. Then, the controller 3 operates the solenoid based on the input information so as to control the running state of the engine 7 or the shifting operations of the hydraulic continuously variable transmission device 8 and the sub-transmission 9. Thus, the tractor travels in an arbitrary travel mode.

Further, the traveling path of the tractor is adjusted by the operation for the steering handle 13, and the deceleration thereof is performed by the operation for the brake pedal 21. However, the brake pedal 21 is used not only for the deceleration operation, but also for the quick turning operation. That is, when the tractor needs to be turned quickly, only one of the brake pedals 21L and 21R corresponding to the inner rear wheel 5 in the turning direction is operated, and hence only one of the brakes corresponding to the rear wheel 5 is operated so as to generate a braking force. Accordingly, the tractor can make a small turn compared to a case where the front wheels 4 are only steered for the turning operation.

Further, the tractor 1 can conduct a work in an agricultural field or travel on a road, but an appropriate travel speed range is different between the agricultural field and the road. For this reason, the speed range is selected by the operation for the main shift lever 30 or the sub-shift lever 31 in response to the travel state in the traveling place when the tractor 1 travels. That is, the speed range during the traveling is selected by the operation for the main shift lever 30 or the sub-shift lever 31.

For example, when the tractor 1 conducts a work in an agricultural field, the driver switches the sub-shift lever 31 to any one of the low speed and the middle speed at the same time when the driver switches the main shift lever 30 to any one of the first-speed level to the eighth-speed level in response to the working speed.

The position of the main shift lever 30 is detected by the main shift lever position detection sensor 35, and the position of the sub-shift lever 31 is detected by the sub-shift lever detection sensor 168. The controller 3 switches the hydraulic continuously variable transmission device 8 to the shift position selected by the main shift lever 30 by controlling the rod 69 of the hydraulic cylinder 52 in response to the detection result from the main shift lever position detection sensor 35. Further, the controller 3 switches the sub-transmission 9 to any one of the low speed and the middle speed by operating the sub-shift clutch of the sub-transmission 9 in response to the detection result obtained from the sub-shift lever detection switch.

Further, when the tractor 1 travels on a road, it is preferable that the driver switch the sub-shift lever 31 to the high speed at the same time when the driver switches the main shift lever 30 to any one of the first-speed level to the eighth-speed level in addition to connecting two brake pedals 21L and 21R to each other through the brake lock plate 23.

Further, when the tractor 1 travels on a road, it is preferable that the tractor 1 perform the brake stop control mode by turning on the brake control on/off switch 29 in addition to the operation for the driver that connects two brake pedals 21L and 21R to each other through the brake lock plate 23. Since the brake stop control mode is performed, the tractor 1 can be stopped without stopping the engine 7, which can be made only by the stepping operation for the brake pedal 21 without need of the stepping operation for the clutch pedal 20.

Figure 11:
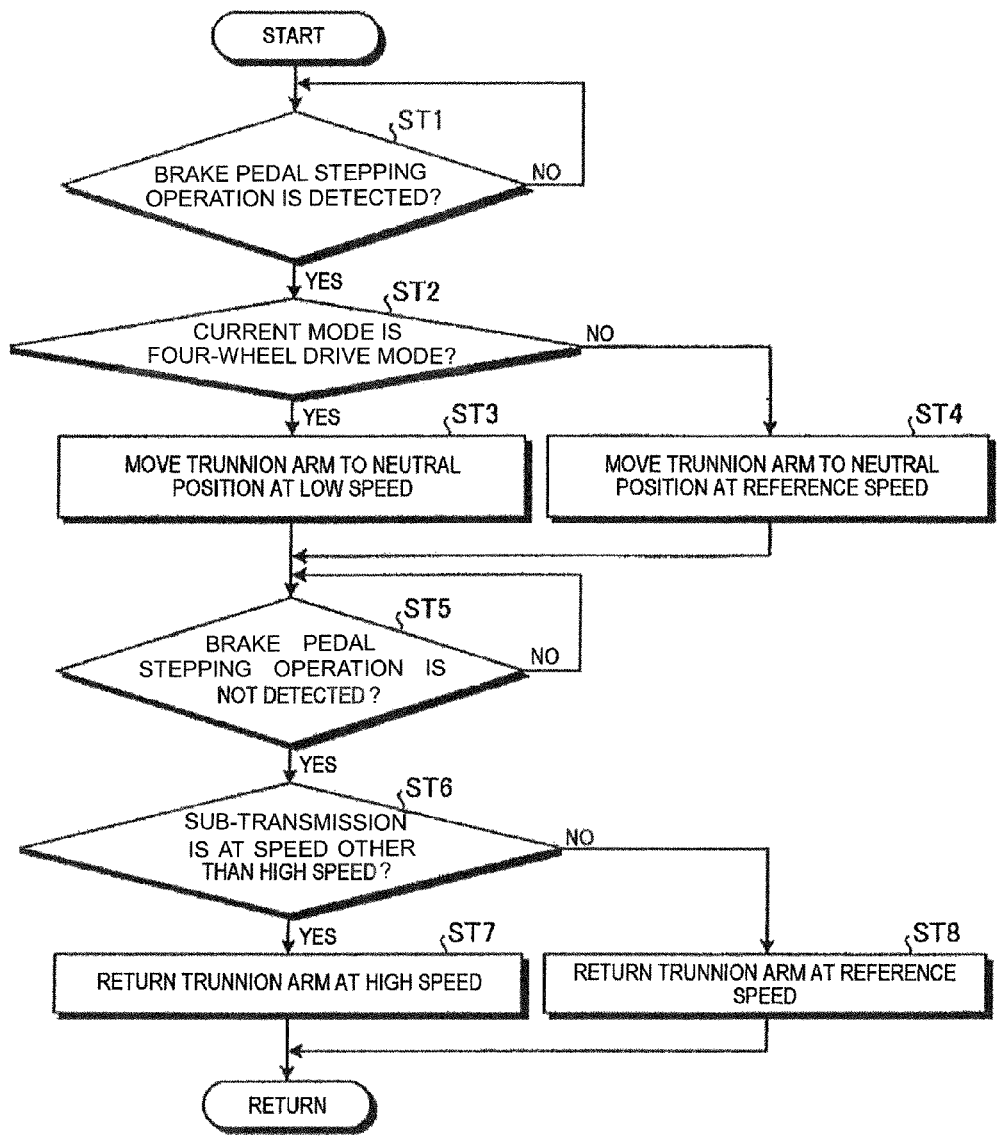
FIG. 11 is one example of a flowchart of a process that is performed by a controller of the tractor according to the first embodiment.

Hereinafter, a trunnion arm movement process which is performed by the controller 3 in the brake stop control mode will be described. FIG. 11 is one example of a flowchart of a process that is performed by the controller of the tractor according to the embodiment. While the tractor 1 travels, the controller 3 lengthens or shortens the rod 69 of the hydraulic cylinder 52 in response to the detection result of the forward/backward lever position detection switch 28, switches the shift position of the hydraulic continuously variable transmission device 8 in response to the detection result from the main shift lever position detection sensor 35, and switches the sub-transmission 9 to any one of the low speed, the middle speed, and the high speed in response to the detection result of the sub-shift lever detection switch. Further, the controller 3 switches the power transmission device 15 to any one of the two-wheel drive mode and the four-wheel drive mode in response to the output of the two-wheel/four-wheel selection switch 165.

As shown in FIG. 11, the controller 3 determines whether the brake pedal detection sensor 25 detects the stepping operation for the brake pedal 21 in the trunnion arm movement process (step ST1). When the controller 3 determines that the brake pedal detection sensor 25 does not detect the stepping operation for the brake pedal 21 (step ST1: No), the process in step ST1 is repeated. In this way, the controller 3 repeats the process in step ST1 until the brake pedal 21 is stepped.

When the controller 3 determines that the brake pedal detection sensor 25 detects the stepping operation for the brake pedal 21 (step ST1: Yes), the controller 3 determines whether the power transmission device 15 is in the four-wheel drive mode based on the output of the two-wheel/four-wheel selection switch 165 (step ST2). When the controller 3 determines that the power transmission device 15 is in the four-wheel drive mode (step ST2: Yes), the operation speed of the hydraulic cylinder 52 is set to the low speed, and the trunnion arm 62 is moved to the neutral position at a low speed (step ST3). Meanwhile, when the controller 3 determines that the power transmission device 15 is not in the four-wheel drive mode, that is, the power transmission device is in the two-wheel drive mode (step ST2: No), the operation speed of the hydraulic cylinder 52 is set to a reference speed, and the trunnion arm 62 is moved to the neutral position at the reference speed (step ST4). With the above-described configuration, according to the embodiment, the controller 3 performs a process of moving the trunnion arm 62 to the neutral position by controlling the hydraulic cylinder 52 when the brake pedal detection sensor 25 detects the stepping operation for the brake pedal 21. In the process, when the power transmission device 15 is in the four-wheel drive mode, the operation speed of the hydraulic cylinder 52 is set to be slow as compared with the operation speed of the hydraulic cylinder 52 in a case where the power transmission device 15 is in the two-wheel drive mode.

Then, the controller 3 determines whether the brake pedal detection sensor 25 does not detect the stepping operation for the brake pedal 21 (step ST5). When the controller 3 determines that the brake pedal detection sensor 25 detects the stepping operation for the brake pedal 21 (step ST5: No), the process in step ST5 is repeated. When the controller 3 determines that the brake pedal detection sensor 25 does not detect the stepping operation for the brake pedal 21 (step ST5: Yes), the controller determines whether the sub-transmission 9 is at a speed other than a high speed based on the output of the sub-shift lever detection sensor 168 (step ST6). When the controller 3 determines that the sub-transmission 9 is at a middle speed or a low speed other than a high speed (step ST6: Yes), the operation speed of the hydraulic cylinder 52 is set to a high speed, the trunnion arm 62 is returned at a high speed to a position obtained before the stepping operation for the brake pedal 21 is detected, that is, the trunnion arm is moved to the neutral position (step ST7), and then the routine is returned to step ST1. Meanwhile, when the controller 3 determines that the sub-transmission 9 is not at a speed other than a high speed, that is, the sub-transmission is at a high speed (step ST6: No), the operation speed of the hydraulic cylinder 52 is set to a reference speed, the trunnion arm 62 is returned at the reference speed to a position obtained before the stepping operation for the brake pedal 21 is detected, that is, the trunnion arm is returned to a position obtained before the trunnion arm is moved to the neutral position (step ST8), and the routine is returned to step ST1. With the above-described configuration, according to the embodiment, the controller 3 returns the trunnion arm 62 to a position obtained before the trunnion arm is moved to the neutral position by controlling the hydraulic cylinder 52 when the stepping operation for the brake pedal 21 is not detected after a state where the brake pedal detection sensor 25 detects the stepping operation for the brake pedal 21. In this case, when the position of the sub-shift lever 31 detected by the sub-shift lever detection sensor 168 is located at a position of setting other than the smallest gear ratio among a plurality of gear ratios, the controller 3 sets the operation speed of the hydraulic cylinder 52 to be fast as compared with the operation speed of the hydraulic cylinder 52 in a case where the position of the sub-shift lever 31 detected by the sub-shift lever detection sensor 168 is located at a position of setting the smallest gear ratio among a plurality of gear ratios. In the embodiment, the position of setting the smallest gear ratio among a plurality of gear ratios is a position of setting a high speed, and the position of setting a speed other than the smallest gear ratio among a plurality of gear ratios is a position of setting a middle speed or a low speed.

As described above, according to the embodiment, the controller 3 performs a process of moving the trunnion arm 62 to the neutral position by controlling the hydraulic cylinder 52 when the brake pedal detection sensor 25 detects the stepping operation. Accordingly, it is possible to suppress the stop (the engine stall) of the engine 7 when the traveling vehicle body 2 is decelerated or stopped. Here, since the traveling resistance of the road surface in the four-wheel drive mode is larger than that in the two-wheel drive mode, an impact which is generated by the stop of the traveling vehicle body 2 easily increases. On the contrary, according to the embodiment, in the above-described process, the controller 3 sets the operation speed of the hydraulic cylinder 52 to be slow in the four-wheel drive mode compared to the two-wheel drive mode. Accordingly, since the hydraulic continuously variable transmission device 8 can be slowly changed to the state (the neutral state) where the input power is not output as a force to move the traveling vehicle body 2 forward or backward in the four-wheel drive mode compared to the two-wheel drive mode, it is possible to suppress a large impact from being generated in the traveling vehicle body 2 when the traveling vehicle body 2 is stopped even in the four-wheel drive mode. Thus, it is possible to smoothly stop the traveling vehicle body 2. Further, according to the embodiment, the operation speed of the hydraulic cylinder 52 in the four-wheel drive mode is set to be slower than that in the two-wheel drive mode. That is, the operation speed of the hydraulic cylinder 52 in the two-wheel drive mode is set to be faster than that in the four-wheel drive mode. Accordingly, since the hydraulic continuously variable transmission device 8 can be quickly changed to the state (the neutral state) where the input power is not output as a force to move the traveling vehicle body 2 forward or backward in the two-wheel drive mode compared to the four-wheel drive mode, the brake reaction distance caused by the inertia of the traveling vehicle body 2 is shortened in corporation with the braking force generated by the stepping operation for the brake pedal 21, and hence the traveling vehicle body 2 can be more safely stopped.

Further, according to the embodiment, the controller 3 returns the trunnion arm 62 to a position obtained before the trunnion arm is moved to the neutral position by controlling the hydraulic cylinder 52 when the brake pedal detection sensor 25 does not detect the stepping operation after a state where the stepping operation is detected. Accordingly, the tractor 1 can smoothly start to move again after the tractor 1 is stopped by the stepping operation for the brake pedal 21.

Here, since the gear ratio is larger than the smallest gear ratio in the case of a gear ratio other than the smallest gear ratio among a plurality of gear ratios, the traveling vehicle body 2 starts to move again slowly when the trunnion arm 62 is returned from the neutral state to the original state at the same speed as the smallest gear ratio. On the contrary, according to the embodiment, when the controller 3 returns the trunnion arm 62 to a position obtained before the trunnion arm is moved to the neutral position by controlling the hydraulic cylinder 52 when the brake pedal detection sensor 25 does not detect the stepping operation after a state where the stepping operation is detected, the operation speed of the hydraulic cylinder 52 is set to be fast when the position of the sub-shift lever 31 detected by the sub-shift lever detection sensor 168 is a position of setting a gear ratio other than the smallest gear ratio among a plurality of gear ratios compared to a case where the position of the sub-shift lever 31 detected by the sub-shift lever detection sensor 168 is a position of setting the smallest gear ratio among a plurality of gear ratios. Accordingly, the traveling vehicle body 2 can quickly start to move again even when the sub-transmission 9 is in the smallest gear ratio among a plurality of gear ratios.

Furthermore, in the trunnion arm movement process of FIG. 11, the controller 3 may switch the power transmission device 15 from the four-wheel drive mode to the two-wheel drive mode along with the operation for moving the trunnion arm 62 to the neutral position at a low speed by setting the operation speed of the hydraulic cylinder 52 to a low speed (step ST3) when the controller determines that the brake pedal detection sensor 25 detects the stepping operation for the brake pedal 21 (step ST1: Yes) and determines that the power transmission device 15 is in the four-wheel drive mode (step ST2: Yes). Accordingly, the traveling vehicle body 2 can be stopped by a natural feeling while the brake is not suddenly operated and the impact is suppressed. Here, for example, in a work in an agricultural field, there is a case where the traveling vehicle body 2 needs to be accurately stopped at a desired stop position in the four-wheel drive mode. Therefore, in the above-described case, the controller 3 may switch the power transmission device 15 from the four-wheel drive mode to the two-wheel drive mode only when the controller determines that the travel speed of the traveling vehicle body 2 detected by the vehicle speed sensor 163 is equal to or higher than a predetermined speed (high speed). Accordingly, since the traveling vehicle body can be easily stopped due to the brake effect in the four-wheel drive mode better than the two-wheel drive mode, the traveling vehicle body 2 can be accurately stopped at a desired stop position such as a ridge limit in the four-wheel drive mode during the work in the agricultural field when the travel speed of the traveling vehicle body 2 is lower than a predetermined speed (a speed other than a high speed). Further, when the travel speed of the traveling vehicle body 2 is lower than a predetermined speed (high speed), the traveling vehicle body 2 can be accurately stopped, even in a barn, at a desired stop position in the four-wheel drive mode. Further, when the travel speed of the traveling vehicle body 2 is equal to or higher than a predetermined speed (in the case of a high speed), the traveling vehicle body 2 is stopped after the two-wheel drive mode is selected. Accordingly, the impact and the sudden braking operation are suppressed.

Further, as described above, the controller 3 may return the power transmission device 15 from the two-wheel drive mode to the four-wheel drive mode when the controller determines that the brake pedal detection sensor 25 does not detect the stepping operation for the brake pedal 21 (step ST5: Yes) in a case where the power transmission device 15 is switched from the four-wheel drive mode to the two-wheel drive mode along with the operation for moving the trunnion arm 62 to the neutral position (step ST3). Accordingly, it is possible to prevent the drive state of the traveling vehicle body 2 from becoming the state (the two-wheel drive mode) being contrary to the state (the four-wheel drive mode) which is intended by the driver when the stopped traveling vehicle body 2 starts to move again. Here, when the brake pedal 21 and the clutch pedal 20 are simultaneously stepped in order to stop the traveling vehicle body 2 while the traveling vehicle body 2 travels on a road, the braking distance increases without the effect of the engine brake. Accordingly, as another example, the controller 3 may return the power transmission device 15 from the two-wheel drive mode to the four-wheel drive mode when the controller determines that the clutch pedal 20 is stepped in a case where the power transmission device 15 is switched from the four-wheel drive mode to the two-wheel drive mode along with the operation for moving the trunnion arm 62 to the neutral position as described above (step ST3). Accordingly, since the two-wheel drive mode is switched to the four-wheel drive mode when the clutch pedal 20 is stepped, the braking distance decreases, and hence the traveling vehicle body 2 can be stopped more safely.

Further, in the trunnion arm movement process of FIG. 11, the controller 3 may operate the trunnion arm 62 so that the travel speed of the traveling vehicle body 2 becomes the travel speed obtained before the determination for the detection of the stepping operation for the brake pedal 21 in step ST1 when the controller 3 determines that the brake pedal detection sensor 25 detects the stepping operation for the brake pedal 21 while the traveling vehicle body 2 travels (step ST1: Yes) and determines that the brake pedal detection sensor 25 does not detect the stepping operation for the brake pedal 21 after the traveling vehicle body 2 is stopped (step ST5: Yes). Further, at this time, an inclination detection sensor that detects the inclination of the traveling vehicle body 2 in the front to back direction is provided, and the operation speed of the hydraulic cylinder 52 that returns the trunnion arm 62 may be slower than the reference speed when the controller 3 determines that the traveling vehicle body 2 starts to move again on an uphill slope (front upward inclination) and the uphill slope (angle) is steeper than a predetermined inclination (angle) based on the output result of the inclination detection sensor. Accordingly, it is possible to suppress the uplift of the front wheels 4 caused by the sudden acceleration when the tractor starts to move again on the uphill slope.

Second Embodiment

Figure 12:
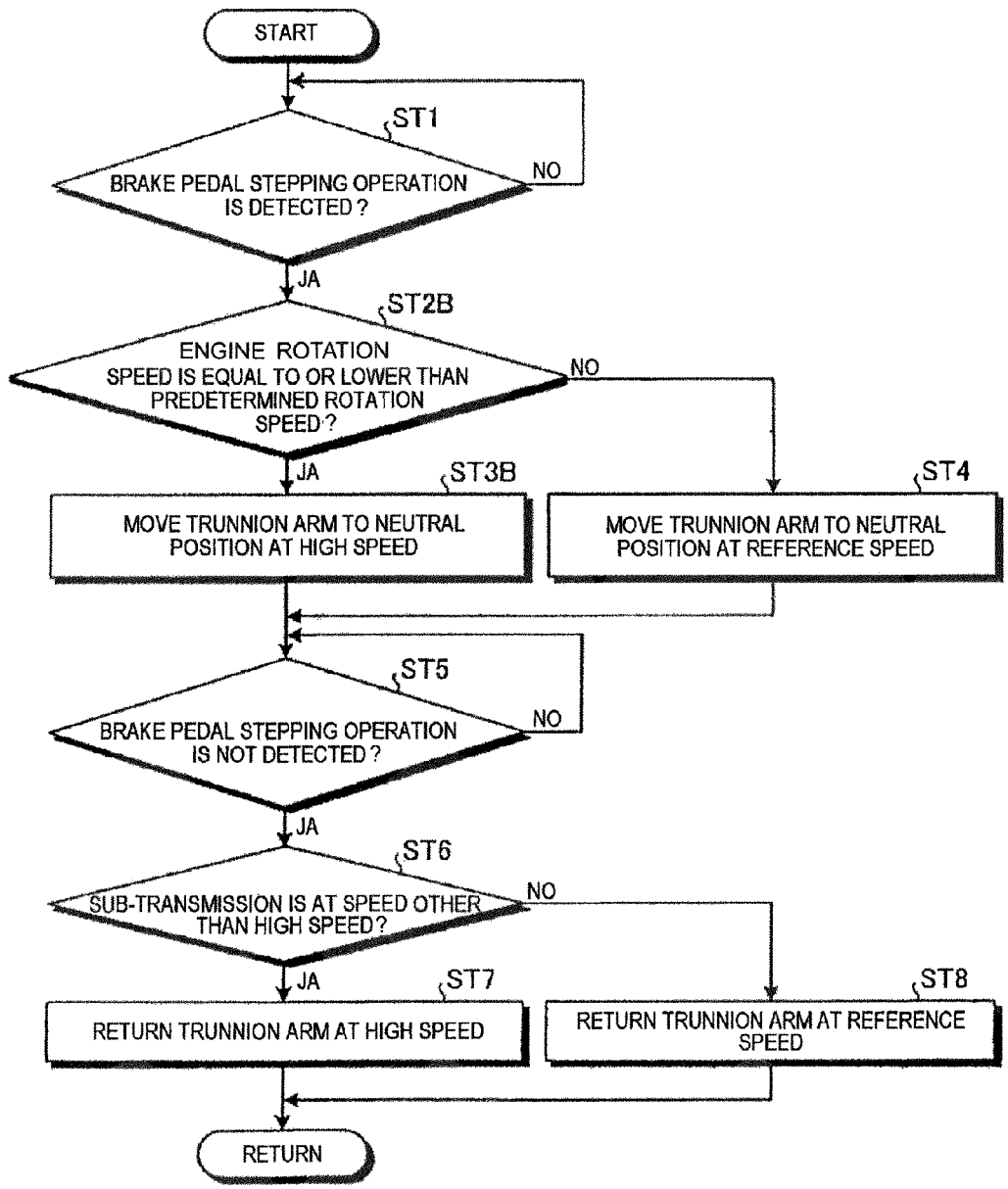
FIG. 12 is one example of a flowchart of a process that is performed by a controller of a tractor according to a second embodiment.

FIG. 12 is one example of a flowchart of a process that is performed by a controller of a tractor according to the embodiment. The embodiment is mainly different from the first embodiment in that a part of the trunnion arm movement process performed by the controller 3 is different.

As shown in FIG. 12, the controller 3 performs the process in step ST1 similarly to the first embodiment. When the controller 3 determines that the brake pedal detection sensor 25 detects the stepping operation for the brake pedal 21 (step ST1: Yes), the controller determines whether the rotation speed of the engine 7 detected by the engine rotation speed sensor 162 is equal to or lower than a predetermined rotation speed (a first predetermined rotation speed) (step ST2B). When the controller 3 determines that the rotation speed of the engine 7 detected by the engine rotation speed sensor 162 is equal to or lower than a predetermined rotation speed (step ST2B: Yes), the operation speed of the hydraulic cylinder 52 is set to a high speed, and the trunnion arm 62 is moved to the neutral position at a high speed (step ST3B). Meanwhile, when the controller 3 determines that the rotation speed of the engine 7 detected by the engine rotation speed sensor 162 exceeds the predetermined rotation speed (step ST2B: No), the operation speed of the hydraulic cylinder 52 is set to a reference speed, and the trunnion arm 62 is moved to the neutral position at the reference speed (step ST4). With the above-described configuration, according to the embodiment, the controller 3 performs a process of moving the trunnion arm 62 to the neutral position by controlling the hydraulic cylinder 52 when the brake pedal detection sensor 25 detects the stepping operation for the brake pedal 21. In the process, when the rotation speed of the engine 7 detected by the engine rotation speed sensor 162 is equal to or lower than a predetermined rotation speed, the operation speed of the hydraulic cylinder 52 is set to be fast compared to a case where the rotation speed of the engine 7 detected by the engine rotation speed sensor 162 exceeds the predetermined rotation speed. The predetermined rotation speed (the first predetermined rotation speed) may be, for example, an idling rotation speed or a rotation speed higher than the idling rotation speed.

Then, the controller 3 performs the processes after step ST5 similarly to the first embodiment.

As described above, according to the embodiment, the controller 3 performs a process of moving the trunnion arm 62 to the neutral position by controlling the hydraulic cylinder 52 when the brake pedal detection sensor 25 detects the stepping operation. Accordingly, it is possible to suppress the engine 7 from being stopped when the traveling vehicle body 2 is decelerated or stopped. Further, according to the embodiment, in the above-described process, when the rotation speed detected by the engine rotation speed sensor 162 is equal to or lower than the predetermined rotation speed (the first predetermined rotation speed), the controller 3 sets the operation speed of the hydraulic cylinder 52 to be fast compared to a case where the rotation speed detected by the engine rotation speed sensor 162 exceeds the predetermined rotation speed. Accordingly, for example, when the rotation speed detected by the engine rotation speed sensor 162 is equal to or lower than the idling rotation speed of the engine 7, the hydraulic continuously variable transmission device 8 can be quickly changed to the state (the neutral state) where the input power is not output as a force to move the traveling vehicle body 2 forward or backward compared to a case where the rotation speed detected by the engine rotation speed sensor 162 is higher than the idling rotation speed of the engine 7. Accordingly, it is possible to suppress the engine 7 from being stopped when the traveling vehicle body 2 is decelerated or stopped. Thus, it is possible to smoothly stop the traveling vehicle body 2.

Furthermore, the controller 3 may set the operation speed of the hydraulic cylinder 52 that returns the trunnion arm 62 to the neutral position to the fastest speed (the highest speed) when the rotation speed of the engine 7 becomes equal to or lower than the idling rotation speed. Accordingly, it is possible to suppress the engine 7 from being stopped when the traveling vehicle body 2 is decelerated or stopped. Thus, it is possible to smoothly stop the traveling vehicle body 2.

Third Embodiment

FIG. 13 is one example of a flowchart of a process that is performed by a controller of a tractor according to the embodiment. The embodiment is mainly different from the first embodiment in that a part of the trunnion arm movement process performed by the controller 3 is different.

As shown in FIG. 13, the controller 3 performs the process in step ST1 similarly to the first embodiment. When the controller 3 determines that the brake pedal detection sensor 25 detects the stepping operation for the brake pedal 21 (step ST1: Yes), the controller determines whether the travel speed of the traveling vehicle body 2 detected by the vehicle speed sensor 163 is equal to or higher than a predetermined speed (step ST2C). When the controller 3 determines that the travel speed of the traveling vehicle body 2 detected by the vehicle speed sensor 163 is equal to or higher than a predetermined speed (step ST2C: Yes), the operation speed of the hydraulic cylinder 52 is set to a low speed, and the trunnion arm 62 is moved to the neutral position at a low speed (step ST3). Meanwhile, when the controller 3 determines that the travel speed of the traveling vehicle body 2 detected by the vehicle speed sensor 163 is not equal to or higher than a predetermined speed (step ST2C: No), the operation speed of the hydraulic cylinder 52 is set to a reference speed, and the trunnion arm 62 is moved to the neutral position at the reference speed (step ST4). With the above-described configuration, according to the embodiment, the controller 3 performs a process of moving the trunnion arm 62 to the neutral position by controlling the hydraulic cylinder 52 when the brake pedal detection sensor 25 detects the stepping operation for the brake pedal 21. In the process, when the travel speed of the traveling vehicle body 2 detected by the vehicle speed sensor 163 is equal to or higher than a predetermined speed, the operation speed of the hydraulic cylinder 52 is set to be slow compared to a case where the travel speed of the traveling vehicle body 2 detected by the vehicle speed sensor 163 is lower than a predetermined speed.

Then, the controller 3 performs the processes after step ST5 similarly to the first embodiment.

As described above, according to the embodiment, the controller 3 performs a process of moving the trunnion arm 62 to the neutral position by controlling the hydraulic cylinder 52 when the brake pedal detection sensor 25 detects the stepping operation. Accordingly, it is possible to suppress the stop of the engine 7 when the traveling vehicle body 2 is decelerated or stopped. Here, in the existing working vehicle, there is a case where a comparatively large impact may be generated in the traveling vehicle body when the hydraulic continuously variable transmission device is returned to the state (the neutral state) where the input power is not output as a force to move the traveling vehicle body forward or backward while the traveling vehicle body travels at a high speed. On the contrary, according to the embodiment, in the above-described process, the controller 3 sets the operation speed of the hydraulic cylinder 52 to be slow when the travel speed detected by the vehicle speed sensor 163 is equal to or higher than a predetermined speed compared to a case where the travel speed detected by the vehicle speed sensor 163 is lower than a predetermined speed. Accordingly, since the hydraulic continuously variable transmission device 8 can be slowly changed to the state where the input power is not output as a force to move the traveling vehicle body 2 forward or backward when the travel speed detected by the vehicle speed sensor 163 is equal to or higher than a predetermined speed compared to a case where the travel speed detected by the vehicle speed sensor 163 is lower than a predetermined speed, it is possible to suppress a large impact from being generated in the traveling vehicle body 2 even when the traveling vehicle body 2 is stopped from the high-speed travel state. Thus, it is possible to smoothly stop the traveling vehicle body 2.

Furthermore, the processes that are performed by the controller 3 in the first to third embodiments can be appropriately combined with one another. That is, the controller 3 may set the operation speed of the hydraulic cylinder 52 that moves the trunnion arm 62 to the neutral position in response to the combination of two or more detection results of the drive state (the two-wheel drive mode and the four-wheel drive mode) of the vehicle wheels (the front wheels 4 and the rear wheels 5), the rotation speed of the engine 7, and the travel speed of the traveling vehicle body 2. Accordingly, it is possible to prevent the engine 7 from being stopped when the traveling vehicle body 2 is decelerated or stopped. Thus, it is possible to smoothly stop the traveling vehicle body 2. That is, since it is possible to prevent the stop of the engine 7 and avoid the sudden braking operation, an appropriate stop feeling can be achieved.

Fourth Embodiment

FIG. 14 is one example of a flowchart of a process that is performed by a controller of a tractor according to the embodiment. The embodiment is mainly different from the first embodiment in that a part of the trunnion arm movement process performed by the controller 3 is different. Furthermore, the embodiment may be also applied to the second and third embodiments.

As shown in FIG. 14, the controller 3 performs the processes in step ST1 to step ST5 similarly to the first embodiment. When the controller 3 determines that the brake pedal detection sensor 25 does not detect the stepping operation for the brake pedal 21 in step ST5 (step ST5: Yes), the controller determines whether the rotation speed of the engine 7 detected by the engine rotation speed sensor 162 is equal to or lower than a predetermined rotation speed (a second predetermined rotation speed) (step ST6A). When the controller 3 determines that the rotation speed of the engine 7 detected by the engine rotation speed sensor 162 is equal to lower than a predetermined rotation speed (step ST6A: Yes), the operation speed of the hydraulic cylinder 52 is set to a low speed, and the trunnion arm 62 is returned at a low speed to a position obtained before the stepping operation for the brake pedal 21 is detected, that is, the trunnion arm is returned to a position obtained before the trunnion arm is moved to the neutral position (step ST7A). Then, the routine is returned to step ST1. Meanwhile, when the controller 3 determines that the rotation speed of the engine 7 detected by the engine rotation speed sensor 162 is not equal to or lower than a predetermined rotation speed, that is, the rotation speed of the engine 7 detected by the engine rotation speed sensor 162 exceeds the predetermined rotation speed (step ST6A: No), the operation speed of the hydraulic cylinder 52 is set to a reference speed, and the trunnion arm 62 is returned at the reference speed to a position obtained before the stepping operation for the brake pedal 21 is detected, that is, the trunnion arm is returned to a position obtained before the trunnion arm is moved to the neutral position (step ST8). Then, the routine is returned to step ST1. With the above-described configuration, according to the embodiment, when the trunnion arm 62 is returned to a position obtained before the trunnion arm is moved to the neutral position by controlling the hydraulic cylinder 52 due to a case where the stepping operation for the brake pedal 21 is not detected after a state where the brake pedal detection sensor 25 detects the stepping operation for the brake pedal 21, the controller 3 sets the operation speed of the hydraulic cylinder 52 to be slow when the rotation speed of the engine 7 detected by the engine rotation speed sensor 162 is equal to or lower than a predetermined rotation speed compared to a case where the rotation speed of the engine 7 detected by the engine rotation speed sensor 162 exceeds the predetermined rotation speed. The predetermined rotation speed (the second predetermined rotation speed) may be, for example, a comparatively low rotation speed such as the idling rotation speed. Furthermore, the predetermined rotation speed may be a rotation speed higher than the idling rotation speed.

As described above, according to the embodiment, when the trunnion arm 62 is returned to a position obtained before the trunnion arm is moved to the neutral position by controlling the hydraulic cylinder 52 due to a case where the stepping operation is not detected after a state where the brake pedal detection sensor 25 detects the stepping operation, the controller 3 sets the operation speed of the hydraulic cylinder 52 to be slow when the rotation speed of the engine 7 detected by the engine rotation speed sensor 162 is equal to or lower than the predetermined rotation speed (the second predetermined rotation speed) compared to a case where the rotation speed of the engine 7 detected by the engine rotation speed sensor 162 exceeds the predetermined rotation speed. Accordingly, since the trunnion arm 62 can be slowly returned from the neutral position even when the engine 7 is comparatively easily stopped and the rotation speed of the engine 7 is comparatively low, it is possible to suppress an occurrence of stopping the engine 7.

Furthermore, when the controller 3 determines that the brake pedal detection sensor 25 does not detect the stepping operation for the brake pedal 21 in step ST5 (step ST5: Yes), the operation speed of the hydraulic cylinder 52 moving the trunnion arm 62 to the neutral position may be set based on the detection result of the state (the high speed, the middle speed, and the low speed) of the sub-transmission 9 described in the first embodiment in addition to the detection result of the rotation speed of the engine.

While the embodiments of the invention have been exemplified, these embodiments are merely examples, and do not limit the scope of the invention. These embodiments may be implemented in various ways, and the omission, replacement, combination, and modification may be made in various forms without departing from the spirit of the invention. Further, the specifications (the structure, the type, the direction, the shape, the size, the length, the width, the thickness, the height, the number, the arrangement, the position, the material, and the like) of the configurations, the shapes, or the display components may be appropriately modified.

What is claimed is:

1. A working vehicle comprising:
a traveling vehicle body which includes vehicle wheels;
an engine which is mounted on the traveling vehicle body;
a power transmission device which selects a four-wheel drive state or a two-wheel drive state, the four-wheel drive state transmitting power of the engine to a front wheel and a rear wheel of the vehicle wheels, and the two-wheel drive state transmitting the power of the engine to one of the front wheel and the rear wheel;
a hydraulic continuously variable transmission device which includes a trunnion shaft displaceable among a forward movement position, a neutral position, and a backward movement position;
an actuator which displaces the trunnion shaft;
a switching operation unit which is used to select the four-wheel drive state or the two-wheel drive state;
a brake pedal which brakes the vehicle wheels; and
a pedaling operation detection unit which detects an operation for the brake pedal,
wherein the working vehicle further comprises a control unit which performs a process for moving the trunnion shaft to the neutral position by controlling the actuator when the pedaling operation detection unit detects the operation for the brake pedal, so that an operation speed of the actuator in a case of the four-wheel drive state, is set to be slow as compared with an operation speed of the actuator in a case of the two-wheel drive state.

2. The working vehicle according to claim 1,
wherein the control unit returns the trunnion shaft to a position obtained before the trunnion shaft is moved to the neutral position by controlling the actuator when the pedaling operation comes to be not detected after a state where the pedaling operation detection unit detects the pedaling operation.

3. The working vehicle according to claim 2, further comprising:
a sub-transmission which is capable of changing speed in a plurality of levels by a sub-shift lever; and
a sub-shift lever detection unit which detects a position of the sub-shift lever,
wherein when the position of the sub-shift lever detected by the sub-shift lever detection unit is located at a position other than a high-speed position, an operation speed of the actuator is set to be fast as compared with an operation speed of the actuator in a case where the position of the sub-shift lever detected by the sub-shift lever detection unit is located at the high-speed position.

4. The working vehicle according to claim 3, further comprising:
a rotation speed detection unit which detects the rotation speed of the engine,
wherein when the rotation speed detected by the rotation speed detection unit is equal to or lower than a second predetermined rotation speed, an operation speed of the actuator is set to be slow as compared with an operation speed of the actuator in a case where the rotation speed detected by the rotation speed detection unit exceeds the second predetermined rotation speed.

5. The working vehicle according to claim 2, further comprising:
a rotation speed detection unit which detects the rotation speed of the engine,
wherein when the rotation speed detected by the rotation speed detection unit is equal to or lower than a second predetermined rotation speed, an operation speed of the actuator is set to be slow as compared with an operation speed of the actuator in a case where the rotation speed detected by the rotation speed detection unit exceeds the second predetermined rotation speed.

* * * * *